United States Patent [19]

Thurston

[11] Patent Number: 4,915,504
[45] Date of Patent: Apr. 10, 1990

[54] OPTICAL RAIL GAGE/WEAR SYSTEM

[75] Inventor: David F. Thurston, Springfield, Va.

[73] Assignee: Norfolk Southern Corporation, Norfolk, Va.

[21] Appl. No.: 214,398

[22] Filed: Jul. 1, 1988

[51] Int. Cl.⁴ .............................................. G01B 11/24
[52] U.S. Cl. .................................................... 356/376
[58] Field of Search .................. 356/1, 385, 372, 377, 356/376

[56] References Cited

U.S. PATENT DOCUMENTS

| | | | |
|---|---|---|---|
| 3,864,039 | 2/1975 | Wilmarth | 356/372 |
| 4,181,430 | 1/1980 | Shirota et al. | 356/375 |
| 4,531,837 | 7/1985 | Panetti | 356/376 |

*Primary Examiner*—Léon Scott, Jr.
*Attorney, Agent, or Firm*—Watson, Cole, Grindle & Watson

[57] ABSTRACT

Disclosed is a method and apparatus for determining the gage and/or wear of railroad tracks in which optical scanning techniques are used in conjuction with a programmable computer for determining the gage and/or wear of the rails.

28 Claims, 16 Drawing Sheets

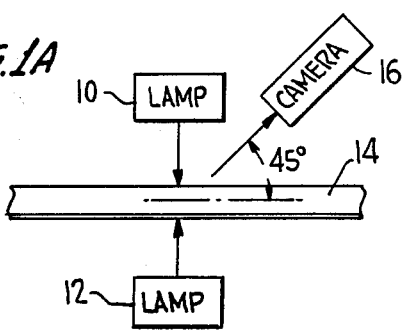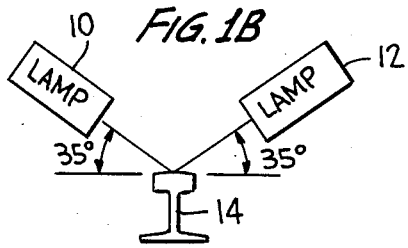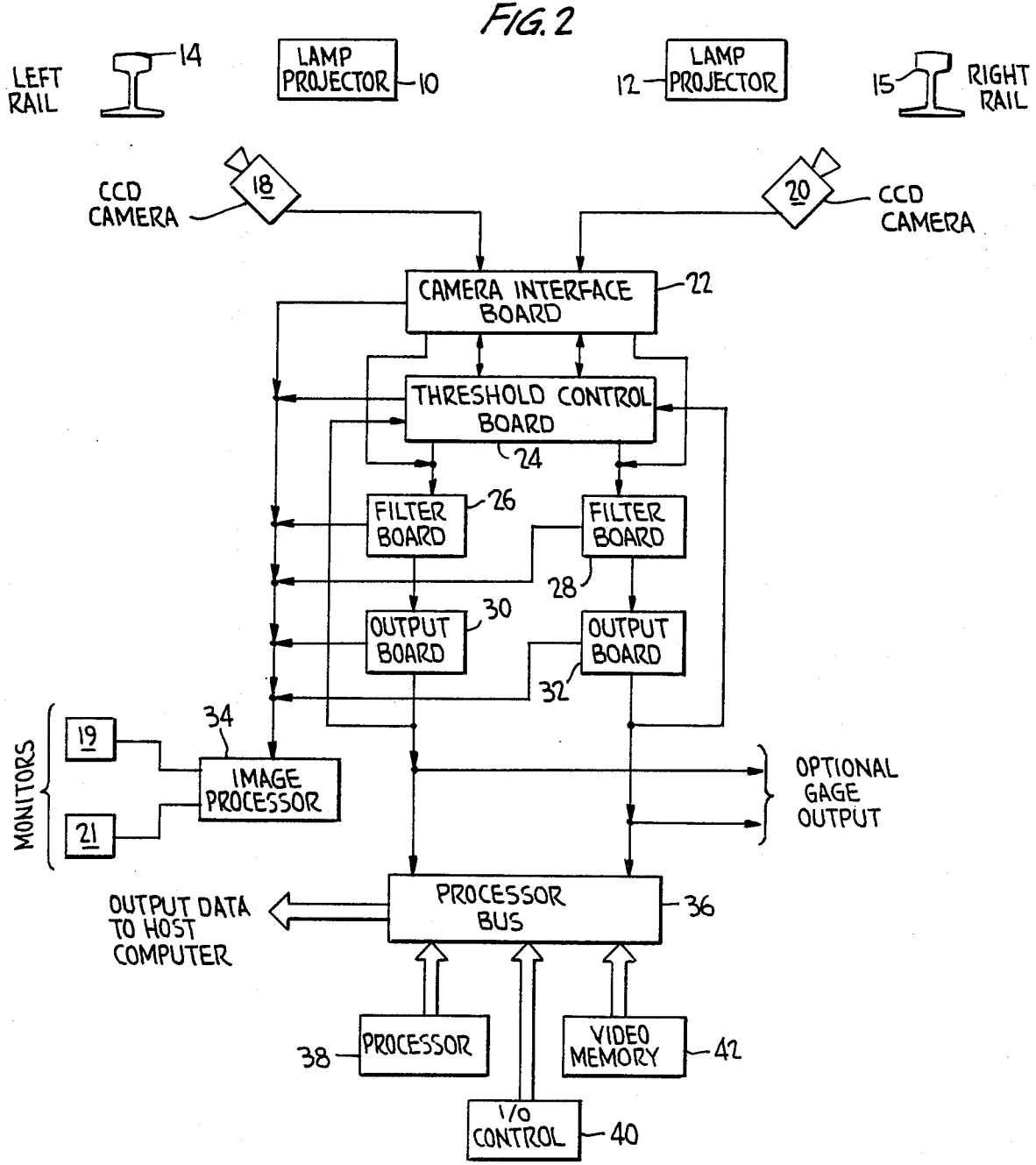

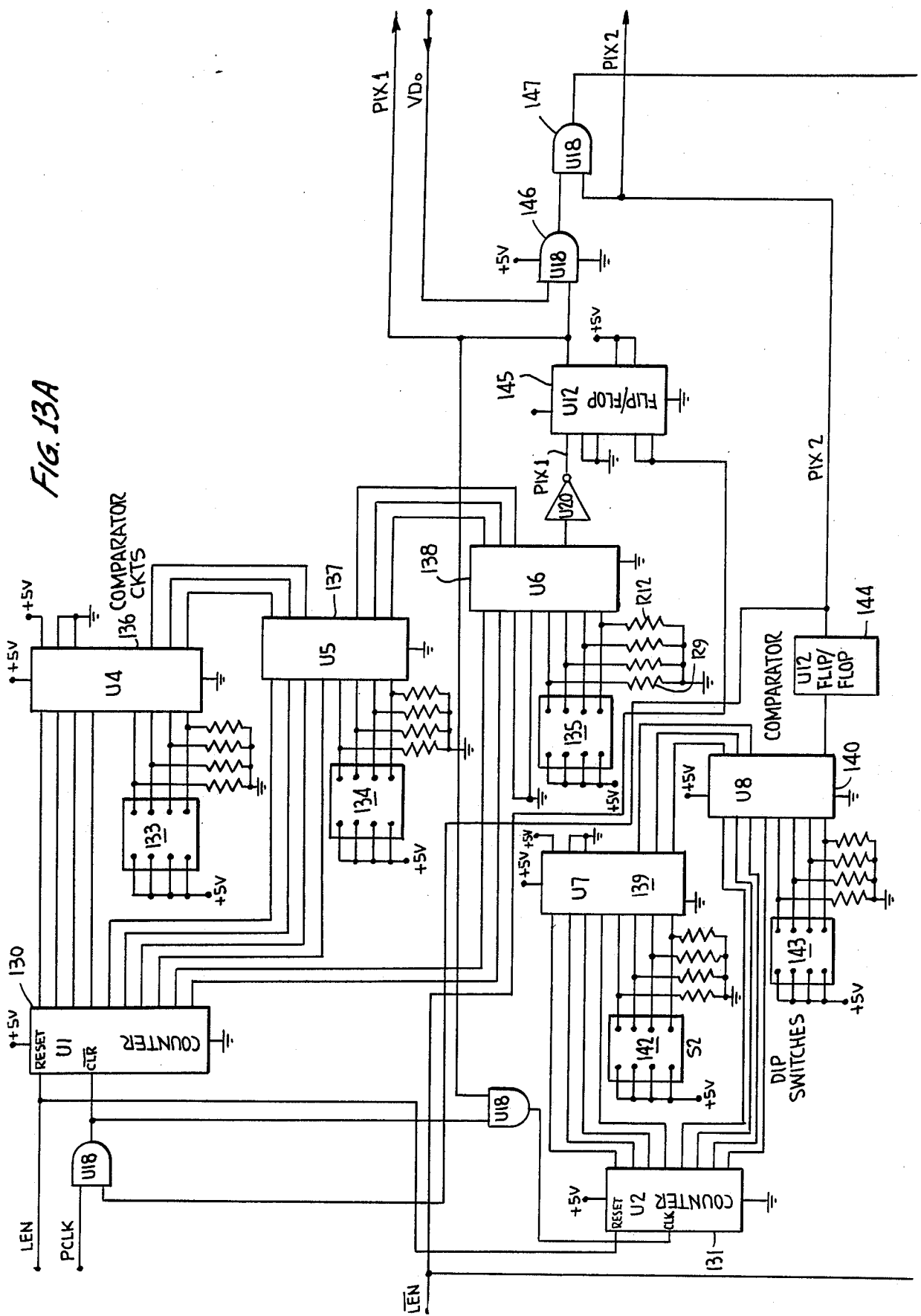

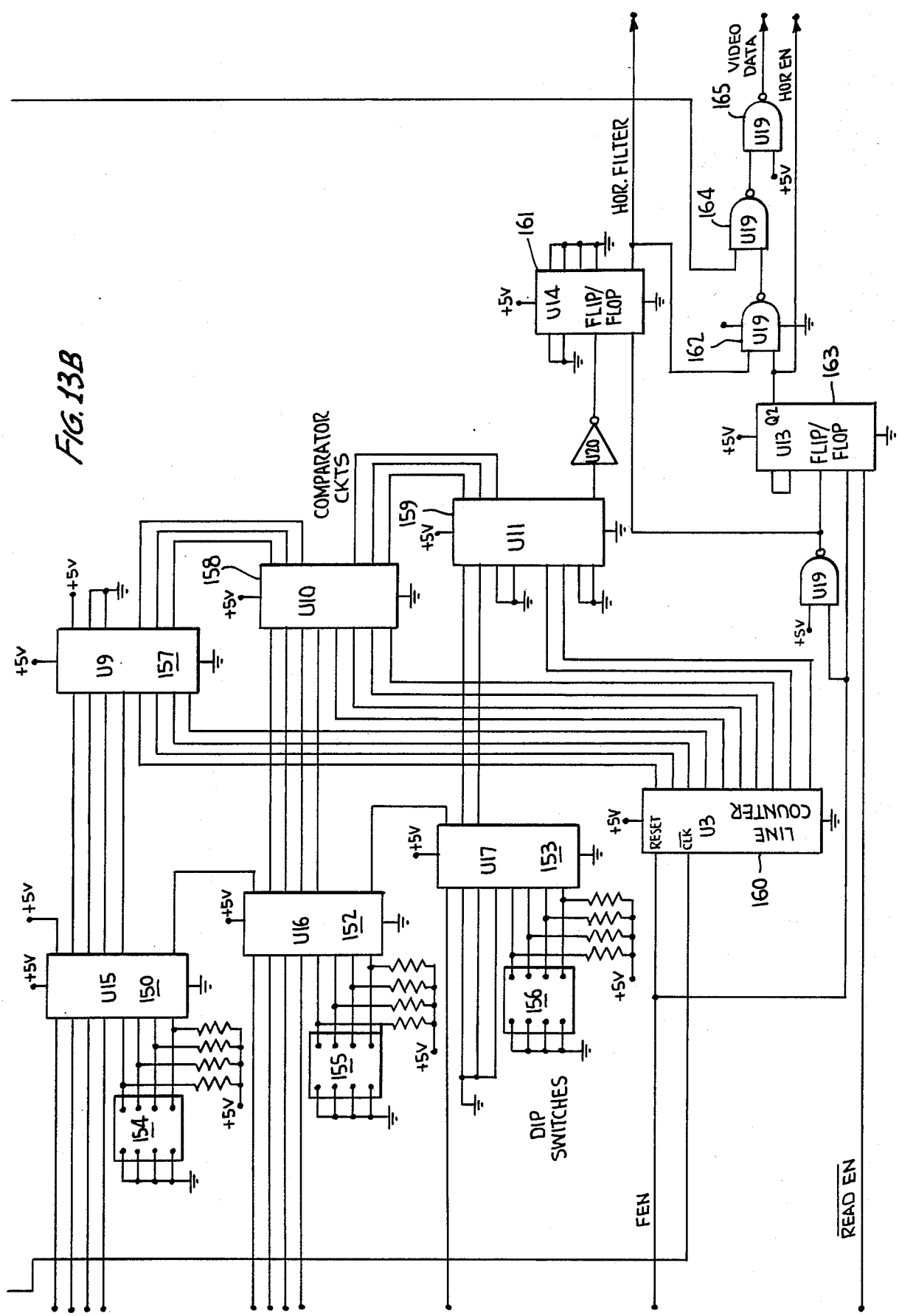

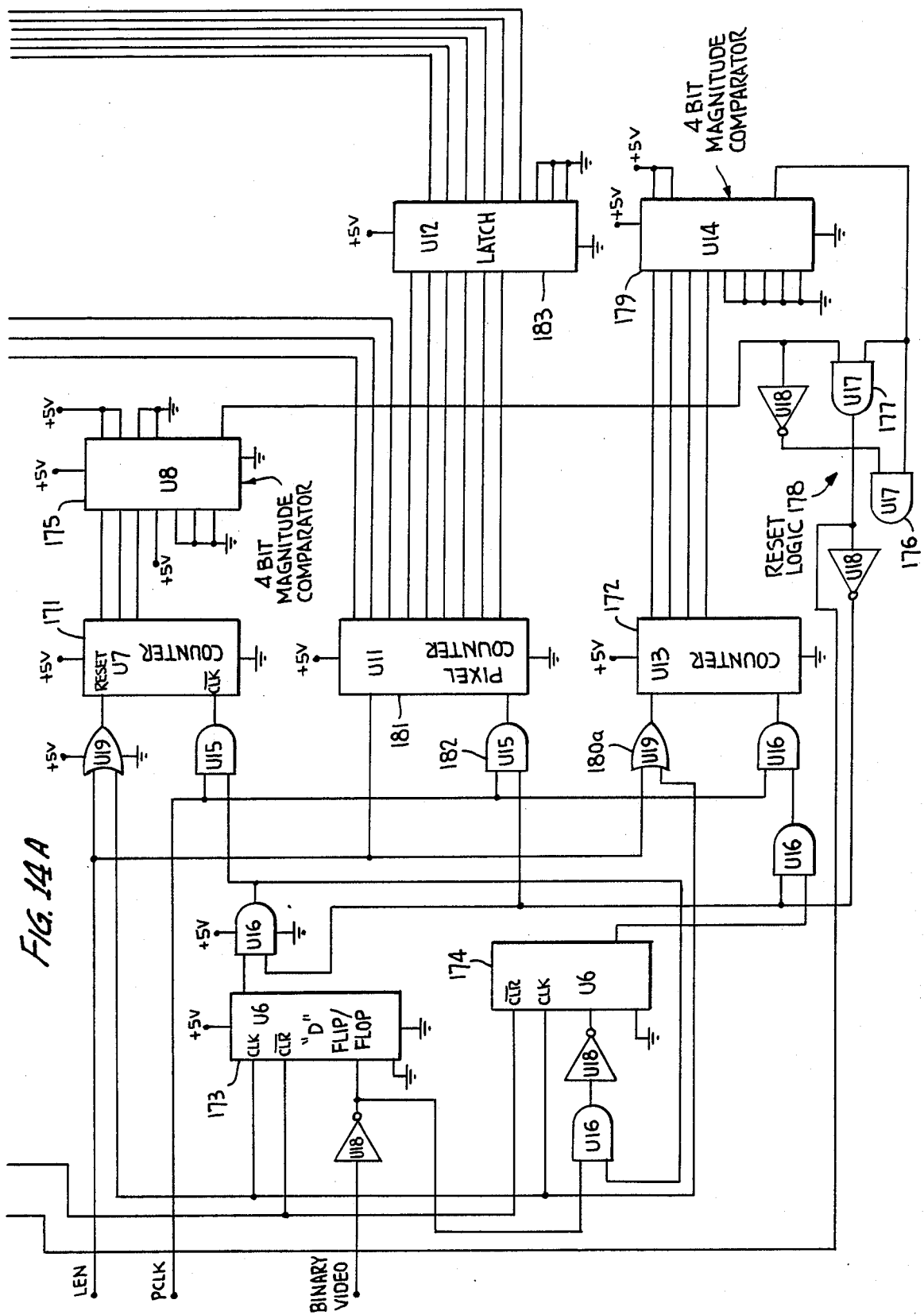

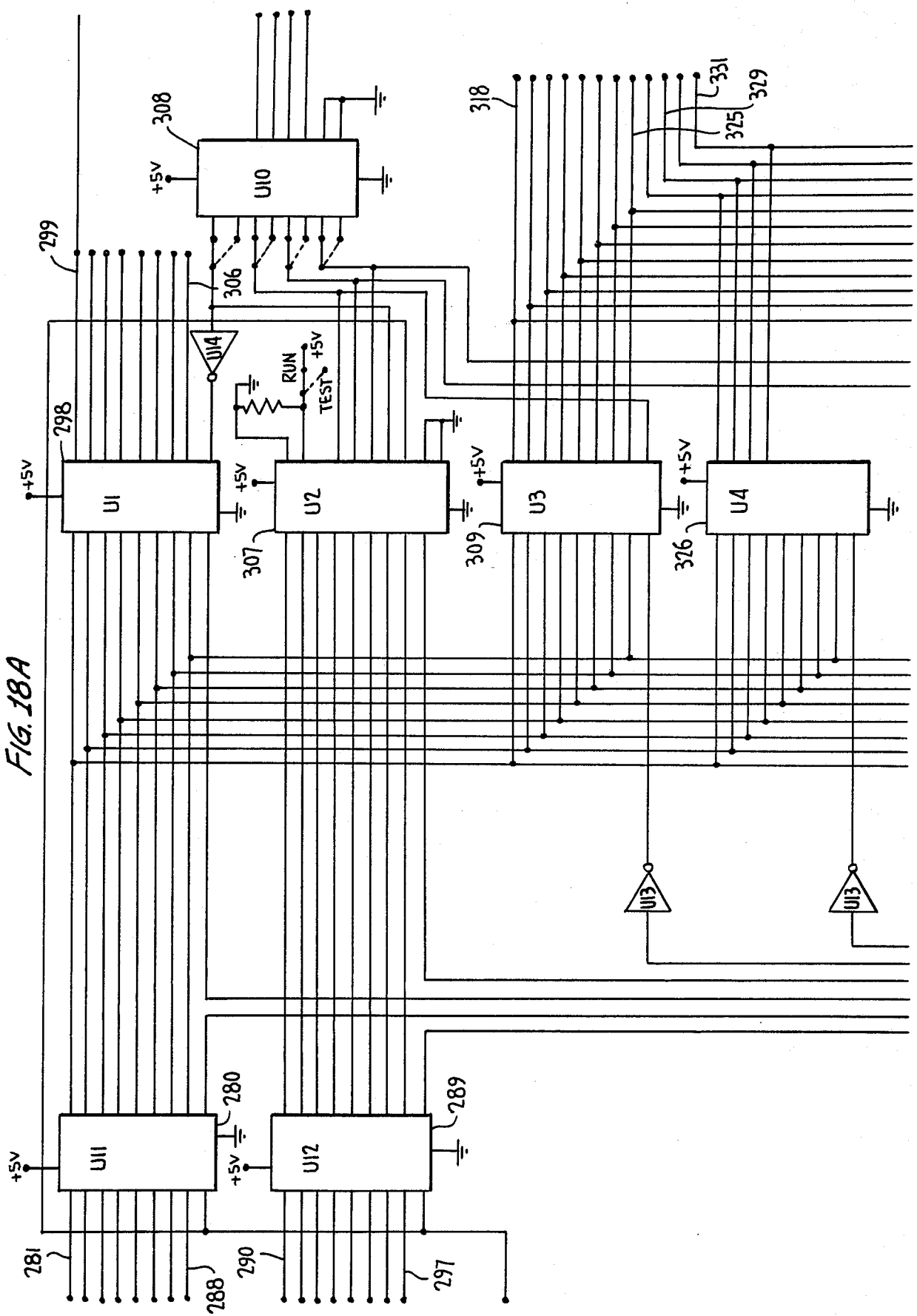

OPTICAL RAIL GAGE/WEAR SYSTEM

BACKGROUND OF THE INVENTION

1. Field of the Invention

This invention relates to both method and apparatus for determining the gage and/or wear of railroad track, and more particularly to such method and apparatus using optical scanning techniques in conjunction with a programmable computer for determining the gage and/or wear of rails. The method and apparatus of the invention is readily adaptable to determining the profile of railroad track rails.

2. Related Art

There are a number of techniques that have been proposed and/or used for determining the gage and/or wear of rails. The following patents are representative of such techniques.

U.S. Pat. No. 4,417,466; Measuring Method and Device for Measuring at Least One Geometrical Characteristic of the Head of the Rails of a Railway Track (Panetti), discloses both method and apparatus for measuring at least one geometrical characteristic of the transverse profile of the head of at least one rail of a railway track. A primary feature of such method and apparatus is the use of a reference base perpendicular to the axis of the track and parallel to a tangent line to the rolling surfaces of the two lines of rails. A further significant feature of the method and apparatus is the determination of the distances separating at least two longitudinal side lines of the tracing of the head of a rail from the reference base. The reference base may be represented by part of a measuring carriage rolling on the track by means of rollers resting vertically and horizontally against the two lines of rails.

U.S. Pat. No. 4,040,738; Railroad Track Profile Spacing and Alignment Apparatus (Wagner), uses railroad car-mounted optical range sensing units to measure the distance between each range sensor unit and the top and side surfaces of each rail. An optical system in each range sensor unit projects an image of a laser beam source onto the horizontal or vertical surface of a track rail to obtain an indication of the points on a projection plane intersected by the rail-reflected image or through a servo balancing system, the degree of movement of the optical systems required to maintain the reflected image approximately at a reference point on the projection plane.

U.S. Pat. No. 4,531,131; Method and Apparatus for Measuring Surface Roughness (Corbin), discloses method and apparatus limited by the spacing of a plurality of sensors at predetermined distance intervals apart from one another. Data samples from the sensors as they are moved relative to the surface being measured at fixed sample distance L are stored as measured over a region of the surface. The stored data is converted into second finite difference data over the region and the second finite difference data is converted into data representative of the space curve of the surface. The plurality of sensors are spaced such that the response characteristic of the plurality of sensors is non-zero for all wavelengths of the surface roughness in excess of a predetermined folding wavelength.

U.S. Pat. No. 4,531,837; Method for Measuring the Transverse Profile of the Head of a Rail of a Railroad Track (Panetti), discloses method and apparatus which projects a radiation trace on the periphery of the head of a rail in a plane forming an angle with the longitudinal axis of the rail and observing the trace from several directions located outside of the plane of projection of the trace. The partial reproductions of the trace are superimposed and angularly displaced around a floating origin by an angle depending on the angles from which the trace is observed.

U.S. Pat. No. 3,562,419; Inspection Method and Apparatus for Track Alignment (Stewart et al), discloses a method and system for inspecting the condition of a railroad track using a TV camera mounted on a vehicle to tape record portions of a track to be inspected and screening the recorded TV picture to compare the results with a standard. The data recorded are the condition of the ballast rail anchors and tie plates, tie and rail, the track level and the alignment and gage. The optical means, or TV camera, is mounted on a longitudinal track travelling frame with a hairline reference either being provided in the camera optical system or the datum may be provided by a wire or wires extending longitudinally of the track.

In U.S. Pat. No. 4,173,073; Track Displacement Detecting and Measuring System (Fukazawa et al), a track displacement and measuring system uses a conventional three-point measuring method to obtain track displacement data for a unit chord length by sensors mounted on three predetermined parts of a track inspection car. The track displacement data is processed to determine the amount of track displacement over a track distance which is two or four times the unit chord length. The system uses a gyro device for detecting vertical track displacement irrespective of the track distance.

The system further includes reflecting members of stainless steel disposed at a predetermined angle with respect to the track, a laser pulse projector, a reflected pulse receiver and a signal processing circuit whereby errors of distance marks used for the recording of measured data can be readily corrected.

In U.S. Pat. No. 4,288,855; Device for measuring Deformations of the Travel Surface of the Rails of a Railway (Panetti), a travelling chassis mounts two pickups arranged opposite a line of rails at a distance apart from each other which is dependent on the length of the wavelength of the deformation to be measured. The signals from the two pickups are input to a measuring circuit with a comparator for forming the difference of the two pickup measurements. The effective wavelength of the deformations is determined and the true magnitude of the trough of the deformation is determined on the basis of the difference, the effective wavelength determined and the distance between the two pickups determined, with subsequent recording of the data.

In U.S. Pat. No. 4,181,430, Method and Apparatus for Optical Method of Measuring Rail Displacement (Shirota et al), a light projector with a slit plate, a reflection mirror for light projection, a reflection mirror for light reception, and a light receptor with a slit plate are installed at specific intervals in the longitudinal direction of the rails on a track inspection car. The light projecting and light receiving elements are arranged so that the light emitted from the light source in the light projector passes through the slit and, being reflected by the reflection mirror for light projection, is directed onto a measuring axis connecting the points as to which measurement is being made on the opposed rails which constitute the tract at at least one of the rails to form a bright spot or band of light at the measuring point on the rail. The light receptor receives only light from the rail at the measuring axis via the reflection mirror for light reception and the slit in the receptor. In the light receptor, a deviation of the points indicated by movement of the bright spot or band due to deviation of the rail position is detected during the running of the track inspection car along the track, and by comparing the deviation with the position of the reference measuring points when the rails are in the correct position, the rail displacement, the track gage deviation and misalignment can be measured.

In U.S. Pat. No. 3,864,039, Rail Gage Apparatus (Wilmarth), light sources mounted on a revenue producing train are focused onto the rail such that the rails reflect certain of the light back to the sensors mounted on the underside of the train, whereby a signal is produced indicating any shifts in the movement of the rails. The sensors comprise a photodetector having an array of photodiodes, the signal outputs of which are input to a processing unit. The projected image is a shadow or a silhouette because the railhead is opaque. As the gage of the rail changes, more or less of the photodiodes are illuminated, and since the signals from the two arrays are correlated electrically in the signal processing unit, an analog signal proportional to gage is obtained.

SUMMARY OF THE INVENTION

The determination of rail wear using video cameras requires techniques for processing incredible amounts of data generated in the video channel. The extraction of rail images from frames of video data can be extremely time consuming considering that there are, for example, typically 200,000 pixels (image elements) in each video frame. The method and apparatus of the present invention, an optical rail gage/wear system (hereinafter—ORG/WS) solves such "real time" data processing problems by using a preprocessor which eliminates the need to scan entire video frames. The preprocessor must have sufficient operating speed to determine certain specified image parameters in real time. In the ORG/WS the optical rail gage system (ORGS), which provides data representative of track gage, forms such an information preprocessor as it provides coordinates in the video frames for a point known to be on the rail and as illuminated by suitable lamp projectors. This approach also eliminates the problem of finding the rail in the video image, and an array of pixels containing all of the information relative to rail wear can be easily determined.

The ORGS, which forms a basic component of the ORG/WS, produces output data representing track gage, which is then utilized by the optical rail wear system (ORWS) to calculate, by an appropriate program (software), data representative of rail wear. Separate lamp projectors transmit respective strips of light perpendicular to the right and left rails of a track to be inspected. Respective CCD (Charge Coupled Device) cameras are mounted to a rigid frame above the plane of the rails and oriented such that the field of view contains the light strip from the projector illuminating the rail web parallel with the horizontal axis on each of two TV monitors. The CCD video cameras generate several pertinent signals input to a camera interface board, namely (1) signals conveying analog video image data; (2) vertical and horizontal sync signals; and (3) pixel clock signals. The vertical and horizontal sync signals and the pixel clock signals are used to map the analog video image data into a format usable by the digital circuits of the ORG/WS.

The camera interface board includes A/D converters for converting the analog video signals into grey scale values that are used by the ORGS in a video memory via a processor bus to be used subsequently by the ORWS processor. Additionally, the camera interface board produces a binary video signal for internal use within the ORGS.

In conjunction with a threshold control board, a sample pixel is examined every frame that is located in an area that is not illuminated by the lamp projector. This pixel is representative of the existing background ambient light. A fixed number of grey levels is added to the grey level of this location to establish a threshold for binary video data used in the ORGS. Grey levels from the A/D converter in the next frame are digitally compared with the new threshold. If the grey level is lower than the threshold, a logic "0" is output to filter board circuitry; and if the grey level is higher than the threshold, a logic "1" is output to the filter board circuitry. The foregoing results in a significant reduction in the data that must be processed by the ORG/WS. Such a "floating threshold" results in a high degree of accuracy since the background ambient light imaged by the CCD cameras varies from location-to-location and day-to-day. Typical accuracy of the ORGS in determining rail gage in actual use is at least 0.017".

The camera interface board circuitry passes binary video directly to separate left and right filter board circuitry, each filter board circuit including two filters, the first being a pixel filter and the second being a dynamic segmentation filter. The pixel filter is similar to a band pass filter and is set up by the system operator when the ORG/WS is first installed. The pixel filter passes binary video signals only within a brief time "window". At the start of every video line a counter is enabled, which value is selected, for example, to be at the $\frac{5}{8}$" gage point of the rail gage face. The comparator output passes the binary video when the counter output is greater than this operator-selected value. The time "window" is only open for a very short period of time after which time the comparator output is forced "low", thereby preventing any additional binary video from passing through the pixel filter. Thus the pixel filter is adapted to pass only video information in the area of the gage face which also has the effect of considerably reducing the data to be processed by the ORGS.

The dynamic segmentation filter is a "vertical" filter operating on lines of the scanner system (rather than pixels) and uses output from the ORGS as feedback. The estimated gage point is targeted by output board circuitry and input to the dynamic segmentation filter. An offset is subtracted from this value, and compared to an incremental line counter that starts at the beginning of each frame. The comparator output is high when the counter value exceeds the calculated value from the filter. This high output is ANDed to the binary video signal that was filtered by the pixel filter such that any binary video above the dynamic segmentation filter line is set to logic "0" (black). The CCD cameras are mounted so that the pixel and dynamic segmentation filters eliminate a majority of the ambient light as well as the effects of surrounding physical objects such as switches, road crossings, etc., that would otherwise cause false triggering of the ORGS.

Filtered binary video from the filter board circuitry is then input to the output board circuitry in the ORGS.

The output board circuitry target the gage point on the rail and present data to a host computer of the ORWS. The binary signals activate white level and black level counters, the contents of which are compared to predetermined values in the output board circuitry. Line, frame and pixel clock signals are used to determine the position of the pixel that is being processed by the aforementioned counters. When three or more white pixels are encountered without detecting three or more black pixels intermixed therein, the output of the line and pixel counters are latched, thereby eliminating the possibility of noise falsely triggering the latched data. The latched data from the line counter is directly proportional to the distance from the CCD cameras to the gage point on the rail. The number of lines is converted to inches (or centimeters) by multiplying it by a simple gain value. Since the CCD cameras are mounted to a fixed point with respect to each other (such as truck frame or car body frame), the distance between the CCD cameras is fixed. Summing that fixed distance with the ORGS normalized outputs results in a non-contact measurement of track gage.

All of the above-described stages of the ORGS provide input data to an image processor which displays the video image from the CCD cameras along with calibration marks on the TV monitors. The calibration marks assist in the set-up of the CCD cameras and provide help in "trouble-shooting" the ORGS in the event of any failure.

As a gage-measuring device, the ORGS output data is highly repeatable with accuracies of up to, for example, 0.017". A two foot sampling rate allows operating speeds of 81 mph with no detrimental effects to data output or the ORG/WS equipment. The development of larger resolution cameras having larger pixel arrays will enable enhanced output data resolution from the ORG/WS.

Because a large or significant portion of the necessary calculations are performed by the hardware components of the ORGS as described above, the actual ORWS processor of the ORG/WS can be a suitably programmed conventional microprocessor. The basic functional components of such a microprocessor are, for example a processor, an I/O control and a video memory. Video grey scale data is input directly into a video memory every frame of the CCD cameras video signals. The video memory is essentially a "frame grabber" that stores all of the grey scale information needed to calculate rail wear. The processor accesses the video memory when it is not being loaded by grey scale video data to eliminate bus contention in a direct memory access (DMA) control function. The I/O control functions include processor communication and diagnostic displays for trouble-shooting aids.

The techniques for determining the points of interest in rail wear measurement use the ORGS output data for determining the point of gage on the gage face of the rails; however such output gage data is not sufficiently accurate for the purposes of rail wear measurement. However, the gage output is used to assist in determining other points that can be used to provide the required accuracy.

The following summary description of various "point" determinations on the rail is taken with respect to FIG. 2.

The first step in the wear calculation is to determine point "a" on the rail, which point is the minimum thickness on the rail web. In determining point "a", the CCD cameras must be aligned such that the pixel axis is parallel with the centerline of the rail. The ORGS output is adjusted toward the base of the rail (along the pixel axis) a number of pixels equivalent to 3.5", for example. This new coordinate is located off the rail above and towards the base from point "a". The grey scale value for this point is read from video memory and adjusted to a threshold value used to create a binary video signal in the rail wear determination calculation. Then the line is "thinned" to a point by scanning the line axis down until the thickness of the light strips on the rail is determined. The coordinate of the point in the exact middle of the stripe is the result of the "thinning" operation. For the point "a" calculation this process is repeated and the results compared until the lowest point on the rail web is found. This point is then stored in the processor memory as point "a".

A point "d" is then calculated next. The number of pixels equal to "1" is subtracted from the line axis of the coordinates of point "a". Then the string of pixels along the line axis toward the base of the rail is "thinned" in the same manner as in the "a" point calculation to determine the exact coordinates of point "d". The results are stored in the processor memory to be processed subsequently.

Point "b" is calculated next; however, instead of subtracting "1" from the line axis of the coordinates for point "a", one-half of the rail web thickness is subtracted from the line axis. The results of this calculation are transferred to the processor from the host computer through the I/O control. The string of pixels along the line axis toward the head of the rail is "thinned" to provide the exact coordinates of point "b". Again these coordinates are stored in the memory for further processing.

The last of the point calculations is performed to find the actual gage point on the gage face of the rail. The number of pixels equal to $\frac{5}{8}$" is subtracted from the pixel axis of the coordinates for point "b" and a "thinning" operation is performed on the line string of points described by the calculated pixel coordinates going towards the centerline of track (in the up direction of the rail image on the monitors). The result of this "thinning" operation is the exact coordinates for point "c", which coordinates are stored in the memory for the final wear calculations.

An alternate method of calculating the actual gage point on the rail is to move up from point "a" toward the top of the rail a fixed distance and "thin" the string of pixels to determine point "b". Point "c" is then determined by moving a fixed distance up from point "d" and then "thin" the string of pixels to provide the exact coordinates of point "c".

Distances A' and B' are calculated, with distance A' representing the absolute value of the operation that subtracts the point "b" along the pixel axis from the point "d" along the same axis. For a new rail of given dimensions, the A dimension is a constant. By simply subtracting A' from A, the total top wear at the centerline of the rail is determined. Similarly, the absolute value of point "c" along the line axis is subtracted from the point "a" along the line axis and is defined as distance B'. Since the dimension B is also a constant for a new rail, B' is subtracted from distance B to determine the total side wear at the gage point. These values are output to the host computer for collective processing as determined by the ORG/WS operator.

After the foregoing results are obtained, the processor releases the data bus so that a new frame of video data can be input into the video memory. When it is determined that there is a new frame of grey level video signals in the video memory, the process described above is repeated.

The system as described above provides outputs every frame of the TV scanning system. At 60 mph this equates to a sample every one and one-half feet.

Furthermore, in the above description of the ORG/WS the two most common points were used in determining the wear on the rail. However, by "thinning" along the pixel and line strings that are normal to the detected edge of the rail, an envelope of points can be output that describe the profile of the rail. A second camera on each rail could aid in such a calculation to recognize transposed rail, the need for (and how much grinding), and other functions now measured by hand, or not at all.

It is believed readily apparent from the following description that a profile of the rail is obtainable essentially by calculating more points on the rail to form a desired rail profile.

BRIEF DESCRIPTION OF THE DRAWINGS

The above features, advantages and objects of the invention are readily apparent when considered in conjunction with the following description of a preferred embodiment of the best mode of carrying out the invention when taken in conjunction with the drawings, wherein:

FIGS. 1A and 1B are a respective top and front elevation view illustrating the positioning of the cameras and the lamp projectors of the ORG/WS with respect to a rail;

FIG. 2 illustrates in block diagrammatic format an embodiment of the basic components of the ORG/WS in accordance with the invention;

FIG. 13A is a schematic of the pixel filter and FIG. 13B is a schematic of the dynamic segmentation filter circuits;

FIGS. 14A and 14B are schematics of the output circuitry;

FIGS. 18A and 18B are schematics of the Input/Output circuitry of the ORWS; and

DETAILED DESCRIPTION

Figure 3:
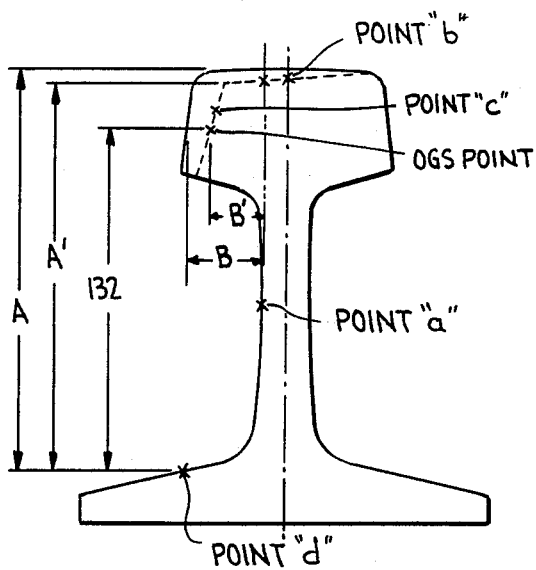
FIG. 3 illustrates a cross section of a rail showing the profile of a new rail and a worn rail and indicating the reference points used in the ORG/WS.

The relative positions of the lamp projectors and camera for a single rail are illustrated in FIGS. 1A and 1B. As shown in FIG. 1A, lamp projectors 10 and 12 are mounted to, for example, a carriage (not shown) astride rail 14 and a CCD camera 16 is mounted at approximately a 45 degree angle to the rail to receive the reflected image of a stripe formed on the rail by each of the lamp projectors. A similar configuration of the lamp projectors and the CCD camera exists for the other rail.

FIG. 1B is a front elevational view showing the relative position of the projector lamps 10 and 12 with projector lamp 10 being at approximately a 35 degree angle with the top of the rail 14 and projector lamp being at an angle of approximately 45 degrees with respect to the top surface of rail 14.

Each of lamp projectors 10 and 12 may utilize a high output lamp source and include a mask at a front aperture to provide a strip of light illumination onto the rail 14. Lasers may also be employed. Improved results are obtained if the lamp projectors 10 and 12 and CCD camera 16 are shaded from the sun. The mechanical aspects of mounting the lamp projectors and the CCD cameras to the carriage are well known to those skilled in the art and are therefore not described in more detail herein. Lamp projectors 10 and 12 are preferably mounted 3.5" above the top surface of rail 14 and the front face of CCD camera 16 is approximately 14–15" from the top surface of rail 14. The output of CCD camera 16 is provided to the camera interface circuitry shown in FIG. 2 via a cable (not shown).

FIG. 2 illustrates an embodiment of the basic components of the ORG/WS which incorporates the ORGS as a component part (although not specifically so identified in FIG. 2). The components shown in FIG. 2 up to the output circuitry providing the optional gage outputs essentially comprise the ORGS which produces output data representing track gage. The processor bus, processor, I/O control and video memory circuits are part of the ORWS.

Lamp projectors 10 and 17 (each one of a pair of lamp projectors as described above with respect to FIGS. 1A and 1B) respectively provide a slice of light onto left and right rails 14 and 15 and CCD cameras 18 and 20 which respectively receive the light reflected from left and right rails 14 and 15. The image of the right and left rails illuminated by lamp projectors 10 and 17 is viewable on respective TV monitors 19 and 21. CCD cameras 18 and 20 each generate (1) signals conveying analog video image data; (2) vertical and horizontal sync signals; and (3) pixel clock signals, which signals are input to camera interface circuitry 22. The use of the sync signals and the pixel clock signals to map the analog video image data into a format usable by the digital circuits of the ORG/WS is described, infra, with respect to FIG. 10. Basically, the camera interface circuits include A/D converters for converting the analog video signals into grey scale values that are used by the ORGS in the video memory 42 via processor bus 36 to be used subsequently by the ORWS processor 38, which may be a host computer suitably programmed to make the necessary point calculations as described hereinafter. The camera interface circuitry also generates a binary video signal for internal use in the ORGS as is described, infra.

The threshold control circuitry 24 establishes a threshold level for the binary video used in the ORGS by examining in every frame a sample pixel that is located in an area that is not illuminated by the two pair of lamp projectors. The sampled pixel is representative of the existing background ambient light. A fixed number of grey levels is added to the grey level of the location to establish the threshold level. Grey levels from the A/D converter in the next frame are digitally compared with the new threshold. If the grey level is lower than the threshold, a logic "0" is output to filter circuits 26 and 28; and if the grey level is higher than the threshold, a logic "1" is output to filter circuits 26 and 28. The "floating threshold" results in a high degree of accuracy since the background ambient light imaged by CCD cameras 18 and 20 varies from location-to-location and from day-to-day. The aforementioned threshold process also results in a significant reduction in the data that must be processed by the ORG/WS.

The binary video data from camera interface circuit 22 is input to separate left and right filter circuits 26 and 28, respectively, each filter circuit including two filters, the first being a pixel filter and the second being a dynamic segmentation filter. The pixel filter has characteristics similar to that of a band pass filter and is set by the ORG/WS operator upon installation of the ORG/WS. The pixel filter passes binary video signals only within a brief time "window". At the beginning of every video line a counter is enabled and the counter output is compared to an operator selected value, which is selected to be at the ⅝" gage point of the rail gage face as shown in FIG. 3. The binary video is passed by the comparator output when the counter output is greater than an operator selected value. Because the time "window" is open for only a brief instant, the pixel filter passes only video information in the area of the gage face, which effectively considerably reduces the data to be processed by the ORGS.

The dynamic segmentation filter is a vertical filter operating on lines of the scanner system (rather than pixels) and uses output from the ORGS as feedback. The estimated gage point is targeted by the output circuits 30, 32 and input to the dynamic segmentation filter. An offset is subtracted from this value and compared to an incremental line counter that starts at the beginning of each frame. The comparator output is high when the counter value exceeds the calculated value from the filter and is ANDed to the binary video signal that was filtered by the pixel filter such that any binary video above the dynamic segmentation filter line is set to logic "0" (black).

Figure 4:
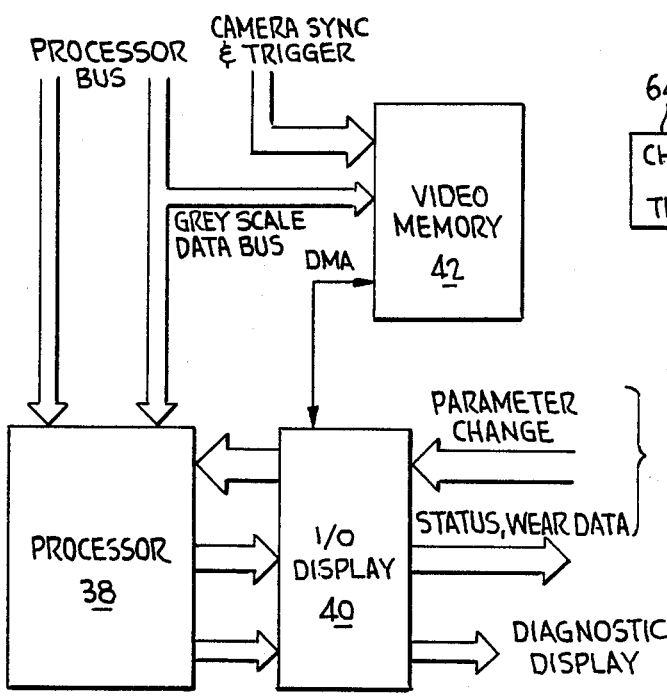
FIG. 4 illustrates in block diagrammatic form an embodiment of the rail wear processor of the ORWS.
Figure 6:
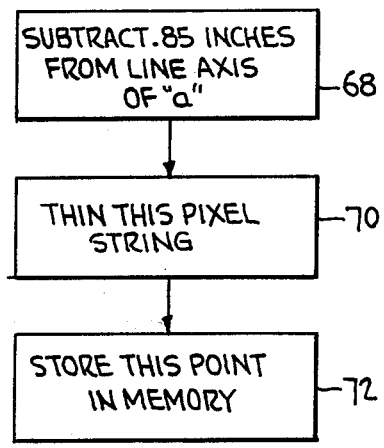
FIG. 6 is a program flow diagram of the calculation of point "d" of the ORG/WS as shown in FIG. 3.

Filtered binary video from the filter circuits 26 and 28 is input to output circuits 30 and 32 to target the gage point on the rail and present data to a host computer of the ORWS as shown in FIG. 4. The binary video signals activate white and black level counters, the contents of which are compared to predetermined values. The position of the pixel that is being processed is determined from line, frame and pixel clock signals. The possibility of noise falsely triggering the latched video data in the output circuits 30 and 32 is prevented by only selecting video data after detection of a number of consecutive white pixels without detecting any black pixels. The latched data from the line counter is directly proportional to the distance from the CCD cameras to the gage point on the rail. The number of lines is converted to inches or centimeters by multiplying the line data by a simple gain value. The distance between the CCD cameras 18 and 20 is fixed and summing that distance with the ORGS normalized outputs results in a noncontact measurement of track gage.

The camera interface circuit 22, threshold control circuit 24, filter circuits 26, 28, and output circuits 30 and 32 all provide input data to image processor 34 which displays the video image from the CCD cameras 18 and 20 along with calibration marks on video monitors 19 and 21.

The basic fundamental components of the ORWS microprocessor are shown in FIG. 4, namely processor 38, I/O control 40 and video memory 42. Video grey scale data is input directly into video memory 42 every frame of the CCD cameras 18 and 20 video signals. Video memory 42 is essentially a "frame grabber" that stores all of the grey scale information required to calculate rail wear. Processor 38 accesses video memory 42 when it is not being loaded by grey scale video data to eliminate bus contention in a direct memory access (DMA) control function. The I/O control 40 functions include host processor communication and diagnostic displays for trouble-shooting aids.

The technique used to determine the points of interest in rail wear measurement is shown in FIG. 3, wherein the rail is shown as viewed on one of the monitors 19 and 21 of FIG. 2, with the pixel axis running left to right and the line axis running from the top to the bottom as scanned by the CCD cameras 18 and 20 of FIG. 2. The image in the other of monitors 19 and 21 is a mirror image. A more detailed description of the view seen on the monitor by the operator of the ORGS is presented, infra, with respect to FIG. 11. In FIG. 3, the solid line represents the profile of a new rail and the dotted line is an exemplary profile of a worn rail.

Figure 5:
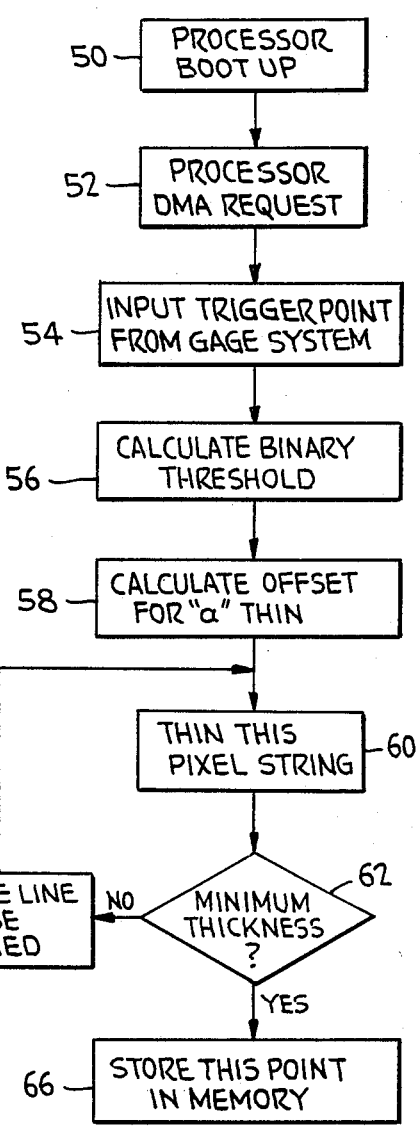
FIG. 5 is a program flow diagram of the calculation of point "a" of the ORG/WS as shown in FIG. 3.

The first step in the wear calculation is to determine point "a" on the rail (FIG. 3), which point is at the minimum thickness on the rail web. The operational program flow for calculating the exact coordinate of point "a" is shown in FIG. 5. The CCD cameras 18 and 20 must be aligned such that the pixel axis is parallel with the center line of the rail. Processor 38 is activated in processor boot up step 50 and in step 54 the target information (input trigger point from ORGS) is received through a separate input port of the computer. The grey scale value for this point is adjusted to a threshold value used to create a binary video signal in the rail wear determination in step 56. The ORGS output is adjusted toward the base of the rail (along the pixel axis) a number of pixels equivalent to 3.5" in step 58. The new coordinate is located off the rail above and towards the base from point "a". The line is then "thinned" to a point by scanning the line axis down until the thickness of the light stripe on the rail is determined. This is accomplished in step 60. The coordinate of the point in the exact center of the light stripe is the result of the "thinning" process. For the point "a" determination the thinning process is repeated and the results compared until the lowest point on the rail web is found as is indicated by steps 62 and 64, and the lowest point is stored in processor memory by step 66.

Point "d" of FIG. 3 is then calculated next by subtracting a number of pixels equal to approximately 0.85" from the line axis of point "a" in step 68. Then the string of pixels along the line axis toward the base of the rail is "thinned" in the same manner as in the point "a" calculation to determine the exact coordinates of point "d" in step 70. The results are stored in the processor memory in step 72 to be subsequently processed.

Figure 7:
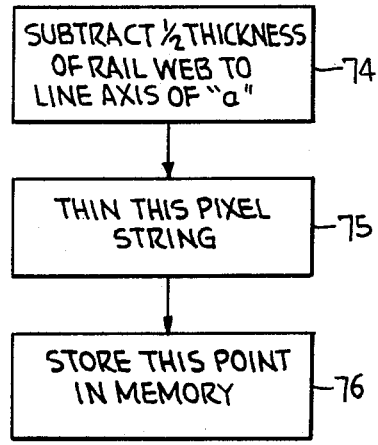
FIG. 7 is a program flow diagram of the calculation of point "b" of the ORG/WS as shown in FIG. 3.

Point "b" is then calculated as shown in operational program flow format in FIG. 7. However, instead of subtracting 1" from the rail line axis of the coordinates for point "a", one-half of the rail web thickness is subtracted from the line axis. The results of this calculation are transferred to the processor from the host computer through the I/O control. The aforementioned functions are carried out in step 74. The string of pixels along the line axis toward the head of the rail is then "thinned" in step 75 to provide the exact coordinates of point "b". Again these results are stored in step 76 in memory for further processing.

Figure 8:
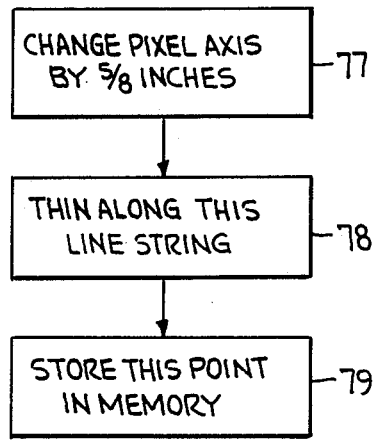
FIG. 8 is a program flow diagram of the calculation of point "c" of the ORG/WS as shown in FIG. 3.

The last of the point calculations is performed to find the actual gage point on the gage face of the rail. The operational program flow is shown in FIG. 8. The number of pixels equal to ⅜" is subtracted from the pixel axis of the coordinates for point "b" in step 77 and a "thinning" operation is performed on the line string of points described by the calculated pixel coordinates going towards the center line of track (in the up direction of the rail image shown in FIG. 11) in step 78. The result of this "thinning" operation is the exact coordinates for point "c", which coordinates are stored in memory in step 79 for the final wear calculations.

Figure 9:
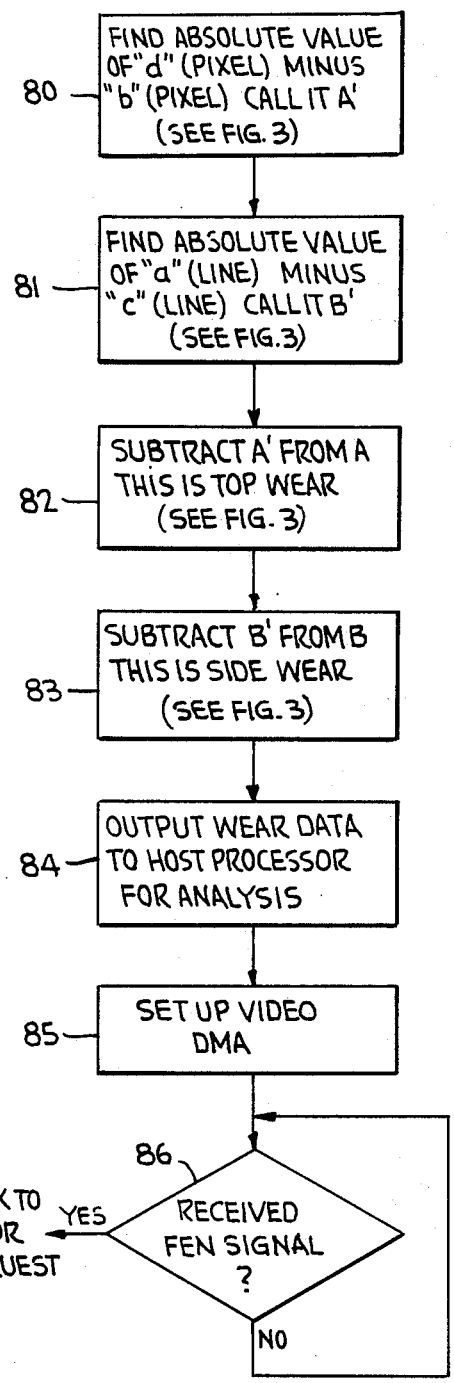
FIG. 9 is a program flow diagram of the calculation of "A" and "B" of the ORG/WS as shown in FIG. 3.

FIG. 9 shows the operational program flow for the final operations of the wear calculation determining process. First distance A' is calculated by finding the absolute value of point "d" and subtracting point "b" therefrom as shown in step 80. Distance B' is then calculated by finding the absolute value of point "a" and subtracting point "c" therefrom as shown in step 81. For a new rail of given dimensions, the A dimension in FIG. 3 is a constant. By simply subtracting A' from A, the total top wear at the center line of the rail is determined, and this subtraction is performed in step 82. Since the distance B in FIG. 3 is also a constant for a new rail, B' is subtracted from distance B in step 83 to determine the total side wear at the gage point of the rail.

These values are output to the Host Computer in step 84 for collective processing as determined by the ORG/WS operator. After the results of the preceding calculations are output in step 84, the processor releases the data bus in step 85 by setting up a video DMA so that a new frame of video information can be input into the video memory. When it is determined in step 86 that there is a new frame of grey level video in the memory, the aforementioned process is repeated.

Figure 10:
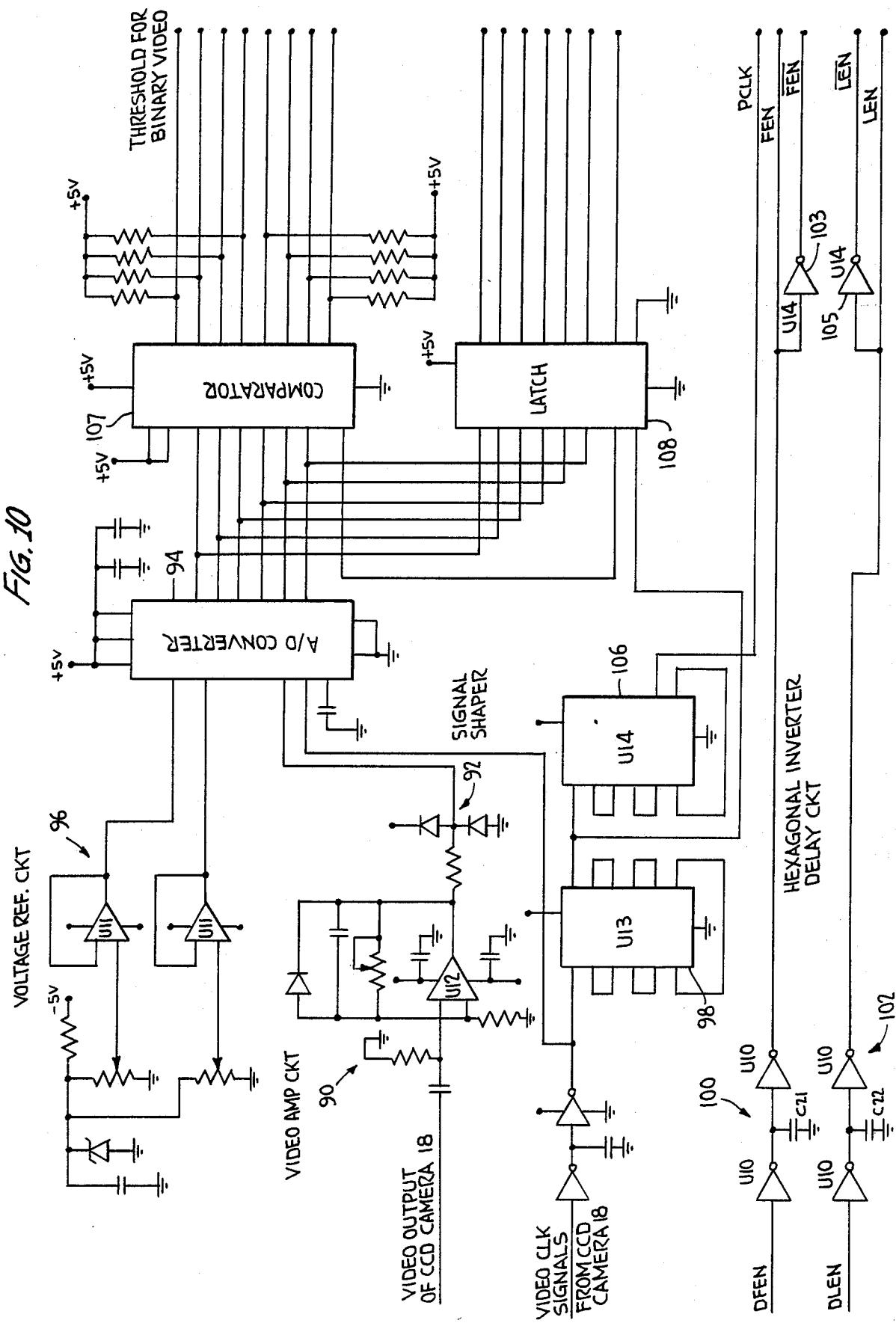
FIG. 10 is a block diagram of an embodiment of the camera interface circuitry.

An exemplary embodiment of the camera interface circuitry 22 of FIG. 2 is shown in schematic form in FIG. 10. Only one of the two camera interface circuits is shown (one required for each of the left and right rails). The video output of CCD camera 18 is input to video amplifier circuit 90 which includes a signal shaping or conditioning circuit 92 establishing positive and negative clipping levels for the amplified audio video signal input to A/D converter 94. Positive and negative reference voltages for the A/D converter 94 are established by voltage reference circuit 96.

The video clock signals from CCD camera 18 are input to hexagonal inverter delay circuit 98 and A/D converter 94. The NOT frame enable (FEN) and NOT line enable (LEN) signals are input to respective paired logic inverters 100 and 102 and then output, with additional logic inverters 103 and 105 providing NOT frame enable (FEN) and NOT line enable (LEN) signal outputs. A second circuit 106 of the hexagonal inverter delay circuit provides a pixel clock signal (PCLK) output at 7.14 MHz (the clock rate of the CCD cameras).

The 6-bit binary video output of A/D converter 94 is input to 8-bit magnitude comparator 107 and also to latch circuit 108, the output of the latter circuit comprising the binary video and grey scale level video output of the camera interface circuit. The 8-bit magnitude comparator circuit 107 provides an output representing the threshold for the binary video.

Figure 11:
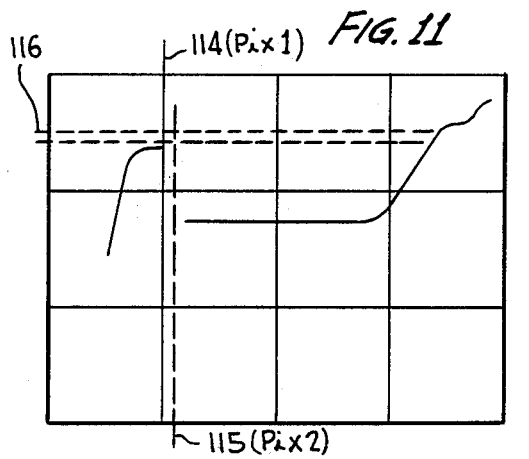
FIG. 11 illustrates a view of a monitor showing the view of a rail and the line and pixel indices as seen by the operator of the ORG/WS.
Figure 12:
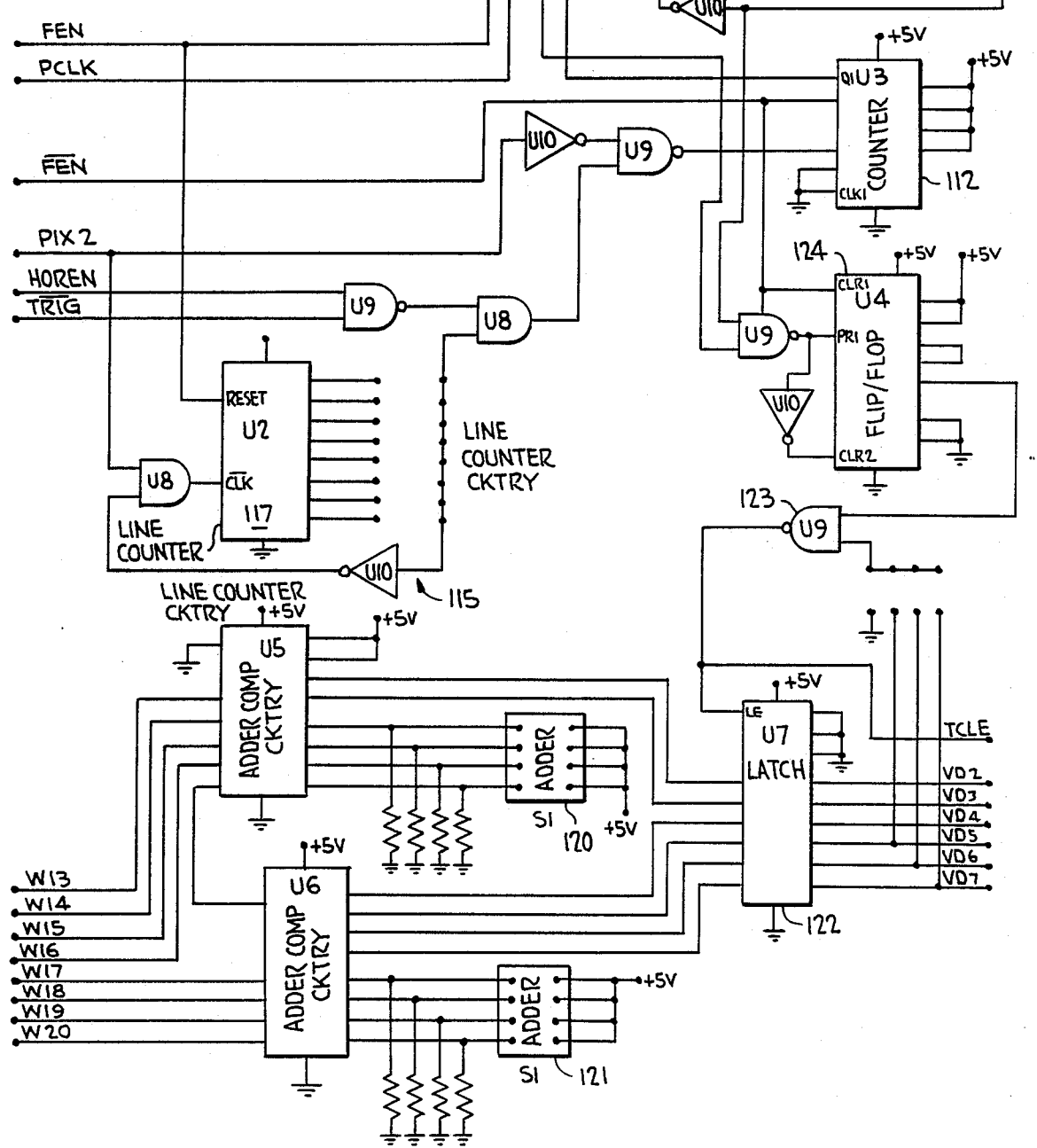
FIG. 12 is a schematic of the threshold control circuitry.

The video threshold levels from a camera interface circuit are input to respective threshold control circuits, an exemplary embodiment of which is shown in FIG. 12. Two such threshold control circuits are required, one for each of the left and right rails. The threshold control circuits also receive the NOT FEN, FEN, PCLK, a pix2 (from the pixel filter line, to be described, infra) and a trigger signal. The FEN is input to reset pixel counter 110. The PCLK is input to AND gate 111 along with the output of pixel counter 112. The output of AND gate 111 is input to AND gate 113 along with inverted pixel signals and the output of AND gate 113 is used to clock pixel counter 110, which counts the pixels from a pixel filter (to be described, infra) to establish a reference index point for the pixel display on the monitor as shown by pixel point reference 114 in FIG. 11.

Line counter circuitry 115, including line counter 117, counts the number of lines down to establish an initial index for the line on the video monitor as shown by index 116 in FIG. 11.

A new threshold from the camera interface circuit of FIG. 10 is input to adder comparator circuits 118 and 119, which include circuits 120 and 121 to add a respective fixed number to the new threshold input. The adder comparator circuits 118 and 119 provide an input to latch circuit 122, which provides video output under control of a signal output from NAND gate 123, which receives a sample pixel input and a Q output from flip-flop 124. These sample pixels are representative of an area of the rails that is not illuminated by the lamp projectors, and as such are representative of the existing background ambient light. The addition of a fixed number of grey levels to the grey level of this location establishes a threshold for binary video used in the ORGS. Grey levels from the A/D converter in the next frame are digitally compared with the new threshold input to adder comparator circuits 118 and 119. If the grey level is lower than the threshold, a logic "0" is output through latch circuit 122.; and if the grey level is higher than the threshold, a logic "1" is output via latch circuit 122. This results in a significant reduction in the data that must be processed by the ORG/WS. Such a "floating" threshold results in a high degree of accuracy since the background ambient light imaged by the CCD cameras varies from location-to-location and from day-to-day. Typical accuracy actually obtained in test runs of the ORG/WS was of the order of 0.017".

FIG. 13A illustrates a schematic of a pixel filter circuit used for each of the left and right rails and as the pixel filter circuits are identical, only one is described herein. Each pixel filter receives binary video from the camera interface of FIG. 10. The purpose of the pixel filter is to establish a "window" within which binary video signals are passed each frame of the scanning of the rails. Counters 130 and 131 are reset by LEN at the start of every video line and are clocked by PCLK. The output of pixel counter 130 is compared with an operator selected value as set in dip switch circuits 133,134 and 135 by 4-bit magnitude comparators 136, 137 and 138 to produce a PIX1 signal output from 4-bit magnitude comparator 138 when the comparison indicates a value greater than the operator selected value. The PIX1 signal initiates the video "window". In the present system the selected value is selected to be at the ⅝" gage point on the rail face as shown in FIG. 3. In a similar manner, a signal PIX2, establishing the end of the video "window" is created by counter 131 and 4-bit magnitude comparators 139 and 140 using operator selected values as determined by DIP switches 142 and 143, such that when the operator selected value is exceeded, the PIX2 signal is output from flip-flop 144. PIX1 is illustrated in FIG. 11 as 114 and PIX2 as 115.

As the time or video "window" is only open for a very brief period of time, only a small amount of binary video data is passed representing an image of the rails in the vicinity of the gage face, thereby considerably reducing the amount of video data to be processed by the ORGS. Signal PIX1 is output from flip-flop 145 and used to control AND gate 146 to control the gating of the binary video data input to the other input of AND gate 146. The output of AND gate 146 is gated by AND gate 147 controlled by signal PIX2.

The gated binary video output is then applied to the dynamic segmentation filter shown in FIG. 13B, which is a vertical filter operating on lines of the scanner system and uses output from the ORGS as feedback. The estimated gage point is targeted by the output circuitry (to be described infra with respect to FIG. 14) and input to the 12-bit subtractor circuits 151, 152 and 153 of the dynamic segmentation filter in FIG. 13B. An offset as determined by Dip switches 154, 155 and 156 is subtracted from the aforementioned gage point target value and compared by comparator circuits 157, 158 and 159 with the output of an incremental line counter 160 that starts counting lines at the beginning of each frame (counter 160 is reset by FEN). The output of comparator circuit 159 is "high" when the output of counter 160 exceeds the calculated value from the magnitude comparator circuits 157, 158 and 159. This signal is then input to flip-flop circuit 161 and the Q output of the flip-flop is then input to NAND gate 162 along with the output of flip-flop circuit 163 to control the gating of NAND gate 164 which also receives as an input the gated binary video from the pixel filter of FIG. 13A. The gated binary video data is output from NAND gate 165 to the image processor circuitry.

The circuitry comprising flip-flop 163 and NAND gates 162, 164 and 165 defeats operation of the segmentation filter in the event that there is no trigger signal on the previous frame.

The CCD cameras 18 and 20 are mounted so that the pixel and dynamic segmentation filters eliminate a majority of the ambient light as well as the effects of surrounding physical objects such as switches, road crossings, etc. that would otherwise cause false triggering of the ORGS.

The filtered binary video outputs from the pixel and dynamic segmentation filter circuits are input to a respective identical output circuit 30 and 31 (shown in block diagrammatic form in FIG. 2), an exemplary embodiment of the circuitry of which is shown in FIG. 14. The output circuits 30 and 31 each target the gage point on a respective rail and present data to a host computer of the ORWS for computation of wear data and/or profile data of the rail. The binary video signals from the respective dynamic segmentation filter activate white level and black level counters, the contents of which are compared to predetermined values (3 in the present embodiment) to reduce or eliminate the effects of noise. Line, frame and pixel clock signals are used to determine the position of the pixel that is being processed by the aforementioned counters. Line counters are used to count lines and the content of the line counters is compared with data representing the rail at the gage point to eliminate processing unnecessary line data. When three or more white pixels are counted without detecting a black pixel intermixed therein, the output of the line and pixel counters are latched. The latched value from the line counter is directly proportional to the distance from the CCD cameras to the gage point on each of the rails. The number of lines is converted to inches (or centimeters) by multiplying it by a simple gain value in the CPU. Because the CCD cameras are mounted to a fixed point with respect to each other (such as a truck frame or car body frame), the distance between the CCD cameras is fixed. Summing that distance with the ORGS normalized outputs results in a non-contact measurement of track gage.

The above outlined functions and operations are carried out by the output circuitry illustrated in schematic format in FIG. 14, which represents one of the identical output circuits used for each rail. The binary video signals at terminal 170 from the respective dynamic segmentation filter of FIG. 13B activate respective white level and black level counters 171 and 172 through respective D-type flip-flop circuits 173 and 174, the latter circuits receiving Line Enable (LEN) and reset signals from reset circuitry to be described, infra. The content of pixel counter 171 is compared with a predetermined number in 4-bit magnitude comparator 175. In the preferred embodiment of the output circuitry described herein, the predetermined number is "3". Thus, after three consecutive white pixels have been counted by pixel counter 171, the output of 4-bit magnitude comparator 175 is input to AND gates 176 and 177 in reset logic circuit 178.

Similarly, if three consecutive black pixels are counted by black pixel counter 172, as determined by comparison on the contents thereof with a number "3" stored in 4-bit magnitude comparator 179, an output therefrom is input to AND gates 176 and 177 in reset logic circuitry 178. The outputs of reset logic circuit 178 is used to control the operation of D-type flip-flop circuits 173 and 174 as well as the output logic OR gates 179 and 180b, which respectively control the resetting of pixel counters 172 and 171.

It should be apparent that the function of the output circuits is to avoid the detection of random white and black pixels, which can occur from events such as gliches in the system to error in the video output of the CCD cameras.

The reset logic circuit output from AND gate 177 controls pixel counter 181 through AND gate 182, which also receives as an input the signal PCLK. Thus, pixel counter 181 is controlled to count the number of pixels subsequent to a detection of at least three white pixels. The contents of pixel counter 181 are latched in latch circuits 183 and 184 for transfer to the host computer for computation of wear data as described, supra.

Line counter 185 receives a control signal FEN and respective signals from reset logic circuit 177 and a trigger signal from 4-bit magnitude comparator 186 to count three successive line signals (thereby eliminating noise generating false line signals). Thus, after the receipt of three "good" line signals, the output of magnitude comparator 186 controls the clocking of line counter 187. The contents of line counter 187 is latched in latch circuits 184 and 188 for subsequent transfer to the host computer and further processing as described, supra.

Monostable multivibrator 189 is activated by a signal output from 4-bit magnitude comparator 189 and input to AND gate 190 along with a READ signal to control the latching of latch circuits 184 and 188.

Figure 15:
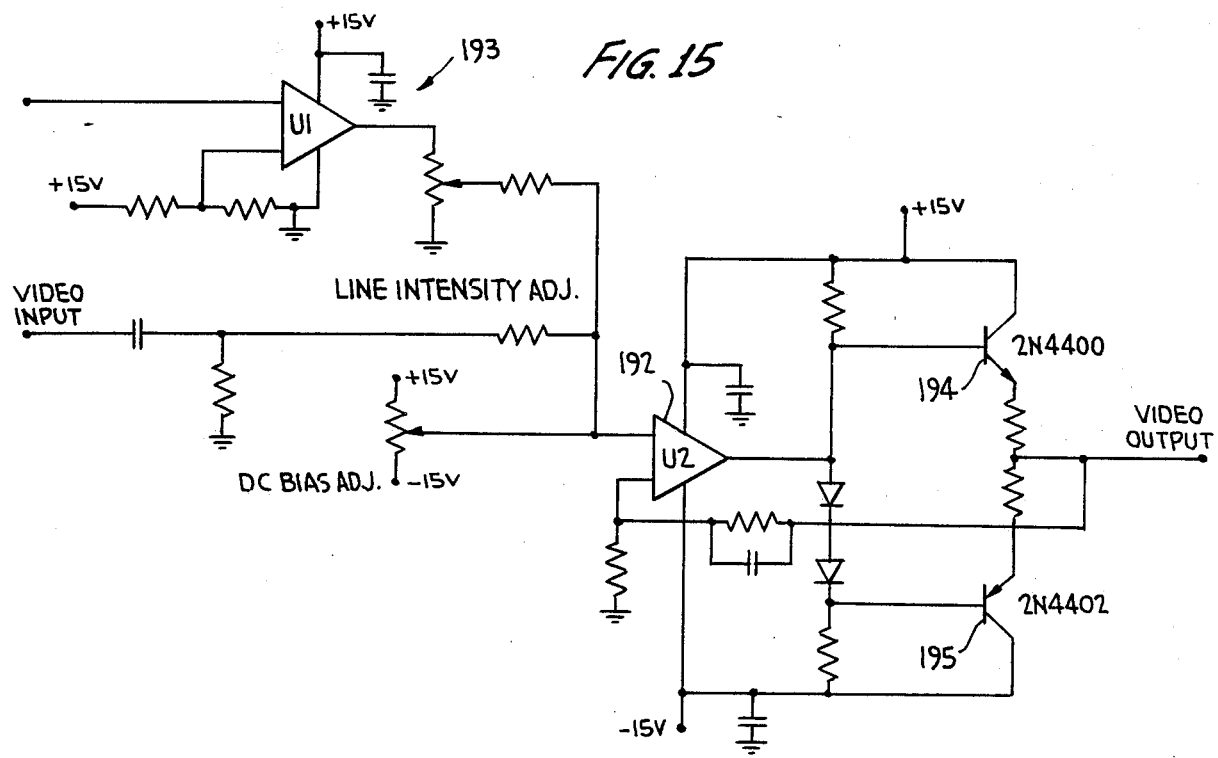
FIG. 15 is a schematic of the video amplifier circuitry.

FIG. 15 shows a standard video amplifier circuit in the image processor circuitry 34 of FIG. 2, which receives a video signal at one input of summing amplifier 192 with line intensity adjustment provided by line intensity adjustment circuit 193. Amplified video signal output is provided by line driver transistors 194 and 195 for overlaying the horizontal and vertical lines on the monitor screens to inform the operator whether the system is triggering, where to place the pixel filter and where the operation point of the dynamic segmentation filter is.

Figure 16:
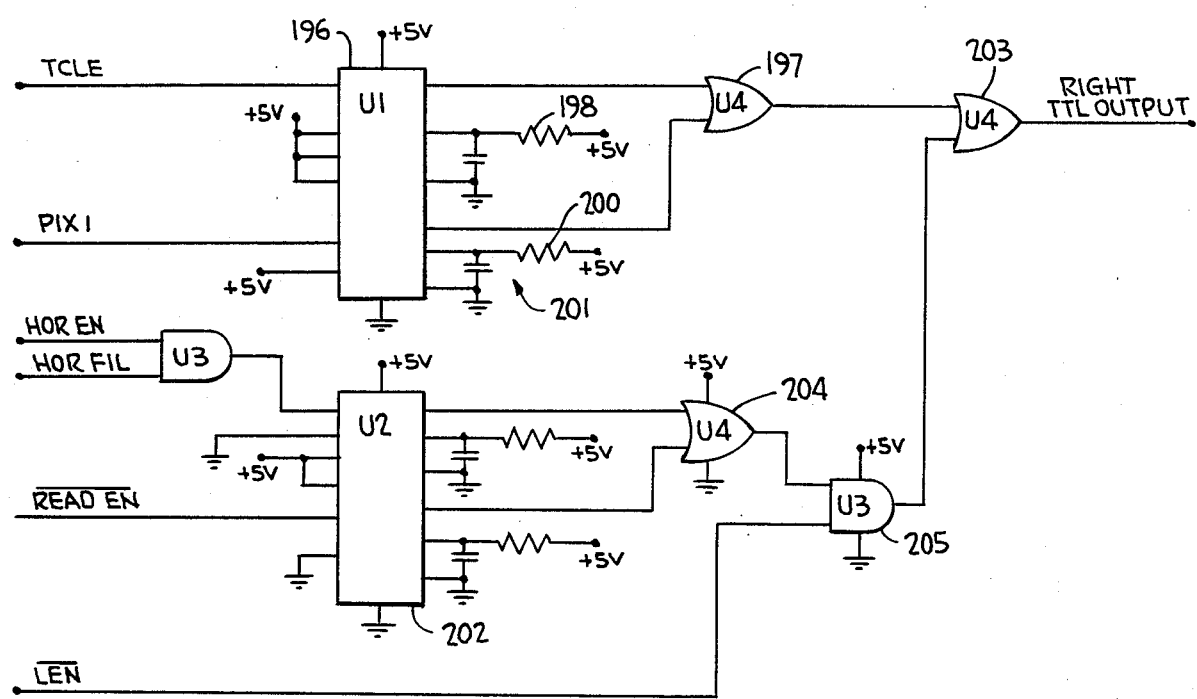
FIG. 16 illustrates the image processor circuitry.

FIG. 16 illustrates an exemplary embodiment of the image processor circuitry 34 of FIG. 2. Only one such image processor circuit is shown, two identical such circuits are required, one circuit for each rail. Monostable multivibrator 196 receives a Threshold Control Latch Enable signal (TCLE) and signal PIX1 to generate a shaped pulse output to OR gate 197. The pulse shape is controlled by the combination of resistor 198 and capacitor 199 and the time constant of multivibrator 196 is controlled by resistor 200 and capacitor 201. A similar multivibrator circuit 202 receives signals HOR EN and HOR FIL and READ EN to provide a pulse shaped output to OR gate 203 (along with the pulse shaped output of OR gate 197) through OR gate 204 and AND gate 205. The output of OR gate 203 represents a TTL signal for the video amplifier for display on the monitors 19 and 21.

An exemplary embodiment of the best mode of carrying out the function of the CPU is shown by the electrical block schematic of FIG. 17 in which CPU 210 is clocked at 6 MHz by clock circuit 212. Buffer driver circuits 214 and 216 provide ADDRESS information to CPU 210 from address lines 218 through 233 in conjunction with address decoder circuit 234 comprising NOR gate 235 and NAND inverter 236 with address information input to NOR gate 235 from address lines 226–233 as shown in FIG. 15. The program memory for address lines 226–233 as shown in FIG. 15. The program memory for the operation of CPU 210 is stored in Eprom 238 which has communication with CPU 210 through buffer driver circuit 240 controlling data lines 241 through 248. CPU 210 provides control signals BUS AKNOWLEDGE (BUS AK), READ (RD), MEMORY REQUEST (MEM RQ), INPUT/OUTPUT REQUEST (I/O RQ), BUS REQUEST (BUS RQ) and WRITE (WR) on respective control lines 249 through 254 through buffer driver circuit 256.

Manual reset of CPU 210 is enabled through manual reset circuit 258. Delay state generator circuitry 260 consists of OR gate 261 and Flip-flop circuits 262, 263, 264 and 265 with NAND gate 266 providing an input to the control WAIT of CPU 210 through AND gate 268. Delay state generator circuitry 260 provides one step debugging of the CPU circuitry of FIG. 17. A debounce circuit 270 prevents transients from affecting the CPU 210 upon activation of switch SW271 and consists of cross-coupled NAND gates 272 and 273 and flip-flop 274. A one step de-bugging function is provided by switch SW275 controlling flip-flop 276 and receiving a MEMORY REQUEST control signal an INPUT/OUTPUT REQUEST control signal through NAND gate 278.

An exemplary embodiment of the best mode of carrying out the Input/Output functions of the ORWS are shown in the block schematic circuit of FIG. 18, in which line information from the ORGS is received through buffer driver circuit 280 through lines 281 through 288 and pixel data from the ORGS is received through buffer driver circuit 289 from lines 290 through 297. Buffer driver circuit 298 receives auxiliary inputs from the host computer on lines 299 through 306; buffer driver circuit 307 receives input address status data under control of decoder circuit 308; buffer driver circuit 309 receives auxiliary data from the CPU 210 on lines 310 through 317 and provides output thereof on lines 318 through 325; buffer driver circuits 326 and 328 receive gage system data from buffer driver circuits 280 and 289 and data from CPU 210 from lines 310 through 317 and provide output thereof relating to side wear of the rail on lines 329 through 331; buffer driver circuits 330 and 332 receive gage system data from buffer driver circuits 280 and 289, data from CPU 210 and provide output of top wear data on lines 318 through 325; and buffer driver circuit 334 receives gage system data from buffer driver circuits 280 and 289, data from CPU 210 and outputs diagnostic display data to display diodes 335 through 342. Decoder circuit 308, activated by an INPUT/OUTPUT REQUEST control signal (IO REQ), controls all of the buffer circuits illustrated in FIG. 18 along with decoder circuit 308a.

An exemplary embodiment of the best mode of carrying out the functions of the video memory 42 of FIG. 2 is shown in block schematic format in FIG. 19, wherein data from a prior frame of the cameras is input from lines 350 through lines 357 to latch circuit 358. Line counter 360 is clocked by the line enable control (LEN) and the output thereof is input to an 8-bit comparator 362 and compared with the output of subtractor circuits 364 and 366, the input of which is the prior frame line data to which is subtracted a fixed amount representing approximately 1" on the rail obtained from dip switches SW368 and SW370. The output of 8-bit comparator 362 is input to OR gate 372 along with a BUS REQUEST control signal to flip-flop circuit 374, the Q output of which is one input of AND gate 376, the other input of which is a pixel clock signal from the output of inverter 378. The output of AND gate 376 forms one input of AND gate 380, with the other input thereto being the NOT Line Enable control signal. The output of AND gate 380 is input to clock pixel counter 382. The contents of pixel counter 382 are latched by latch circuit 384 and input to memory 386 from which the pixel data is output on data bus lines 387 to 394. Pixel counter 382 is reset by the output of OR gate 395 to which is input the line and frame enable control signals LEN and FEN.

In a similar manner line counter 396 is clocked by the output of AND gate 398 to which are input the Q output of flip-flop 374 and the line enable control signal LEN. Line counter 396 is reset by the frame enable control signal FEN. The contents of line counter 396 are latched by latch circuit 400 and input to memory 386 to be output on data bus lines 401 through 408.

A DMA controller at video rates is formed by OR gates 410 and 412 respectively receiving the NOT WRITE and NOT MEMORY REQUEST signals and NOT MEMORY REQUEST and NOT CPU C9 control signals; and the respective outputs of which are input to AND gates 414 and 416. The output of AND gate 414 is the control signal NOT WE and is input to memory 386 and to the other input of AND gate 416. The output of AND gate 416 is a NOT CHIP SELECT (CS) control signal and input to memory 386.

Those skilled in the computer and railroad track gage and wear arts will recognize that there are many modifications that are apparent from the above description of a preferred embodiment of the best mode of carrying out the invention. Thus the above description is not to be taken as limiting the invention, the scope of which is intended to be determined by the following claims and the equivalents to which the various components thereof are entitled.

TABLE OF COMPONENTS

Figure 14B:
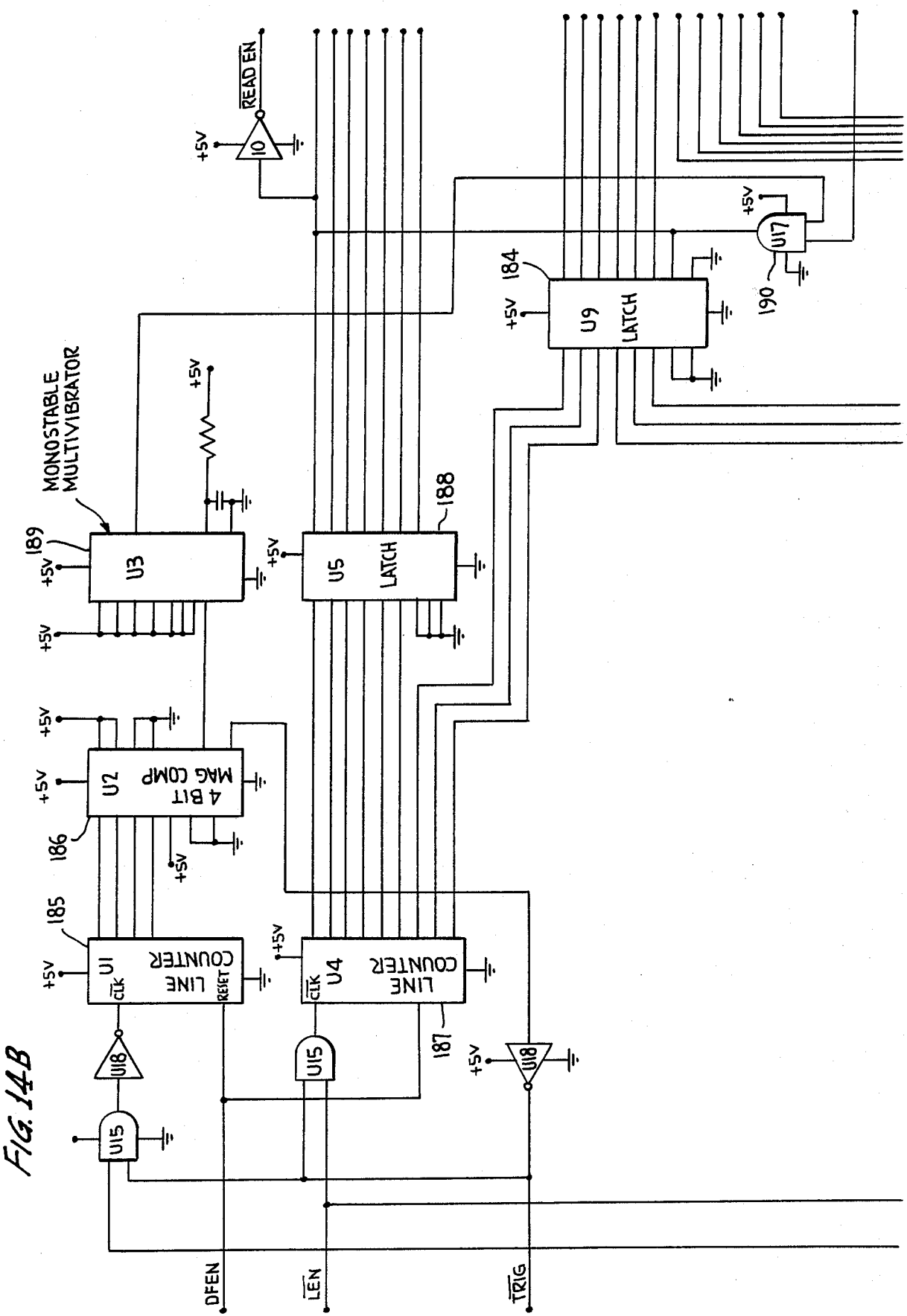
Figure 17A:
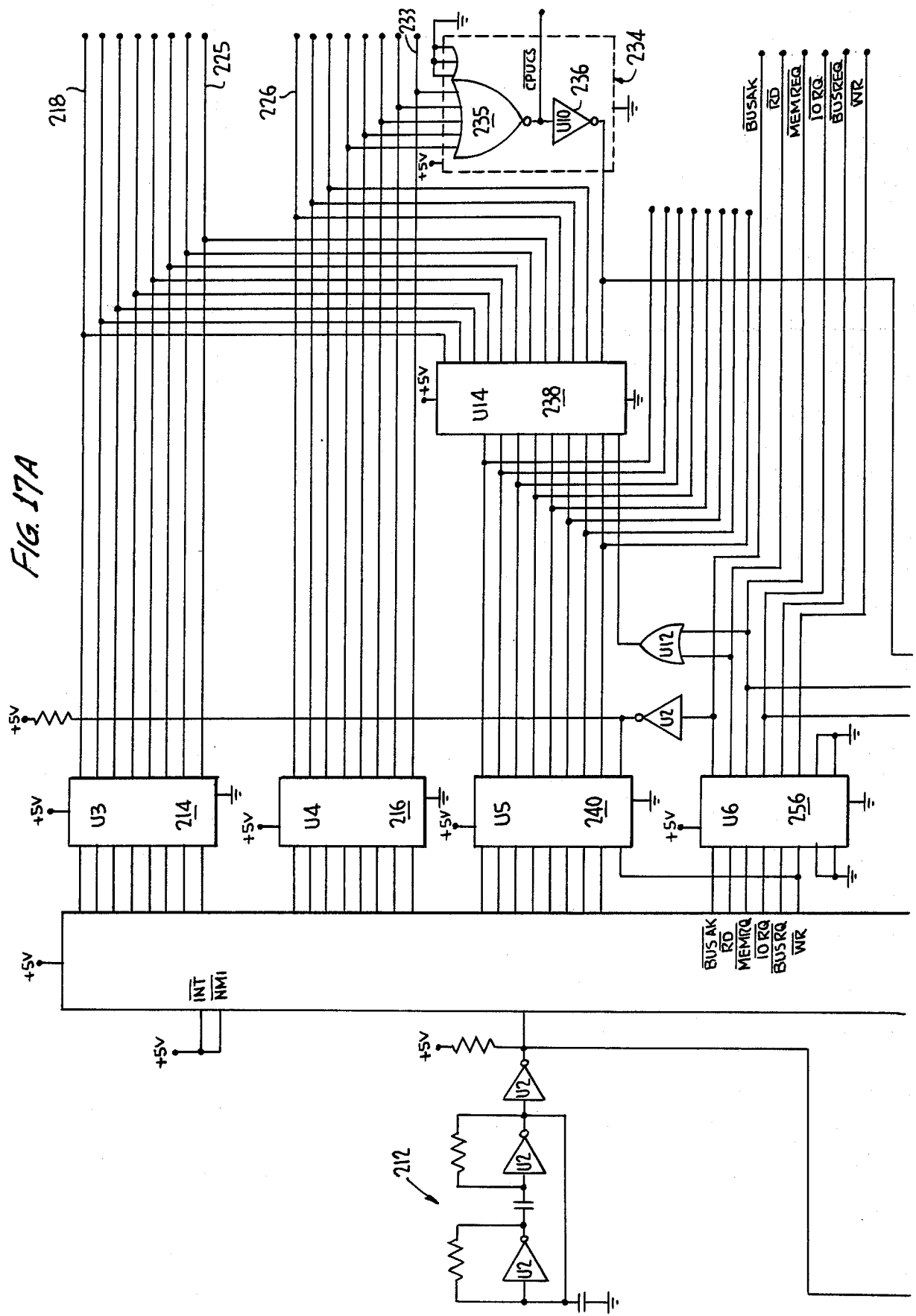
FIGS. 17A and 17B are schematics of the central processor of the ORWS.
Figure 17B:
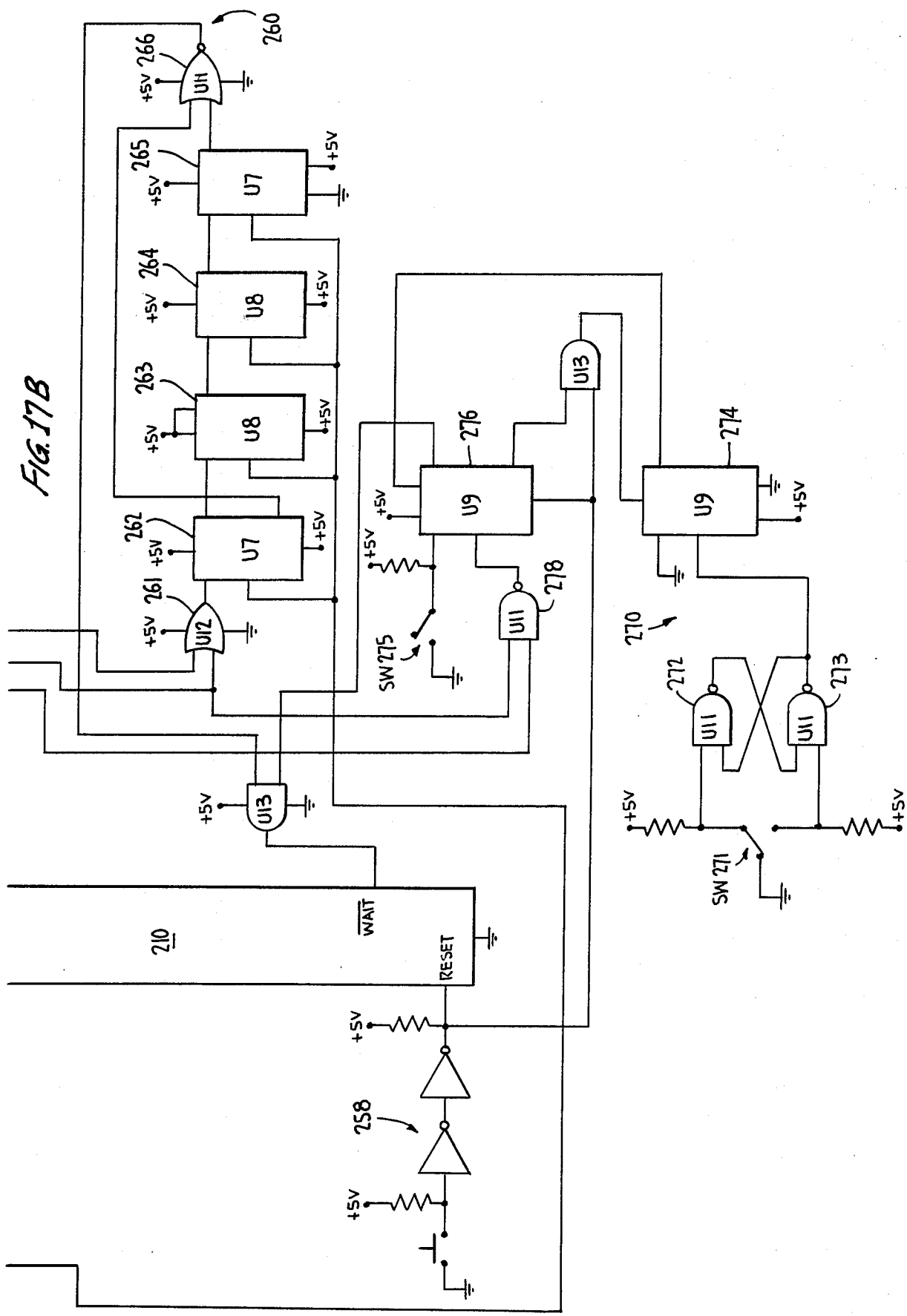

| Component | Component Type |
|---|---|
| FIG. 10 | |
| U1, U2, U3, U4, U5, U6, U7, U8, U9, and U10 | uA9637AC |
| U11 and U15 | 747 |
| U12 and U16 | CA 3100 |
| U13, U14, U17 and U18 | 74HCO4 |
| U19 and U20 | CA 3300E |
| U21 and U23 | 74 LS684 |
| U22 and U24 | 74 LS573 |
| U25 | uA9368AC |
| FIG. 12 | |
| S1 and S2 | 8 TSP Dip Switches |
| U1, U2, U11 and U12 | 74HC4040 |
| U3, U4, U13 and U14 | 74HC74 |
| U5, U6, U15 and U16 | 74HC283 |
| U7 and U17 | 74H7573 |
| U8 and U18 | 74HC08 |
| U9 and U19 | 74HC00 |
| U10 and U20 | 74HC04 |
| FIGS. 13A and 13B | |
| U1, U2 and U3 | 74HC4040 |
| U4, U5, U6, U7, U8, U9, U10 and U11 | 74HC85 |
| U12, U13 and U14 | 74HC74 |
| U15, U16 and U17 | 74HC74 |
| U15, U16 and U17 | 74HC283 |
| U18 | 74HC08 |
| FIGS. 14A and 14B | |
| U10 and U18 | 74HC04 |
| U15, U16 and U17 | 74HC08 |
| U1, U4, U7, U11 and U13 | 74HC4040 |
| U2, U14 and U18 | 74HC85 |
| U5, U9 and U12 | 74HC573 |
| U3 | 74HC4538 |
| U6 | 74HC74 |
| U19 | 74HC32 |
| FIG. 15 | |
| U1 and U2 | RCA CA3100E |
| FIG. 16 | |
| U1, U2, U5 and U6 | 74HC4538 |
| U3 | 74HC08 |
| U4 and U7 | 74HC32 |
| FIGS. 17A and 17B | |
| U1 | Z803 |
| U2 | 74LS14 |
| U3, U4 and U6 | 74NC7244 |
| U5 | 74NCT245 |
| U7, U8 and U9 | 74NCT4 |
| U10 | 74HC4078 |
| U11 | 74HC00 |
| U12 | 74HC32 |
| U13 | 74HC08 |
| U14 | 2716 |

TABLE OF COMPONENTS-continued

Figure 18B:
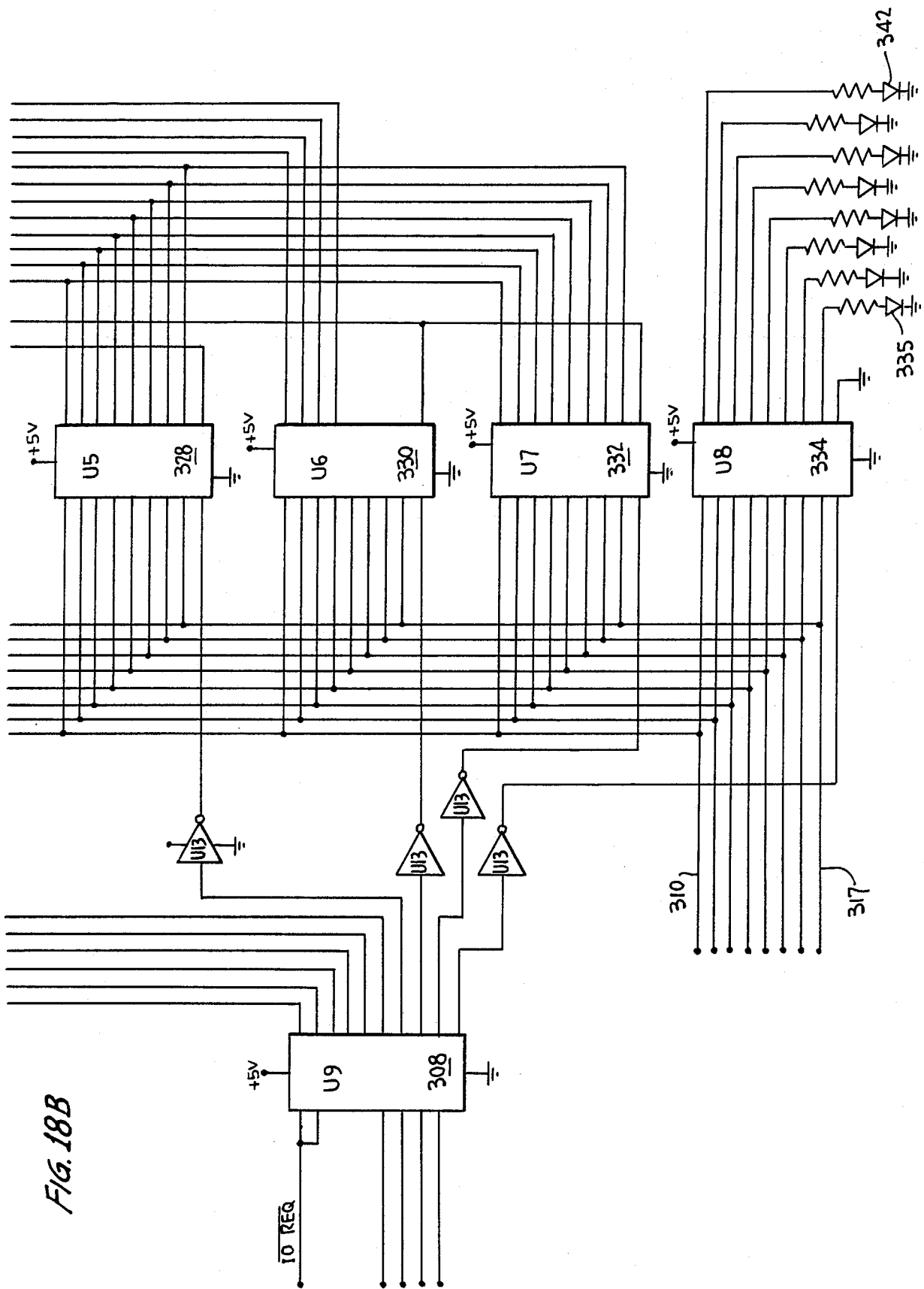
Figure 19A:
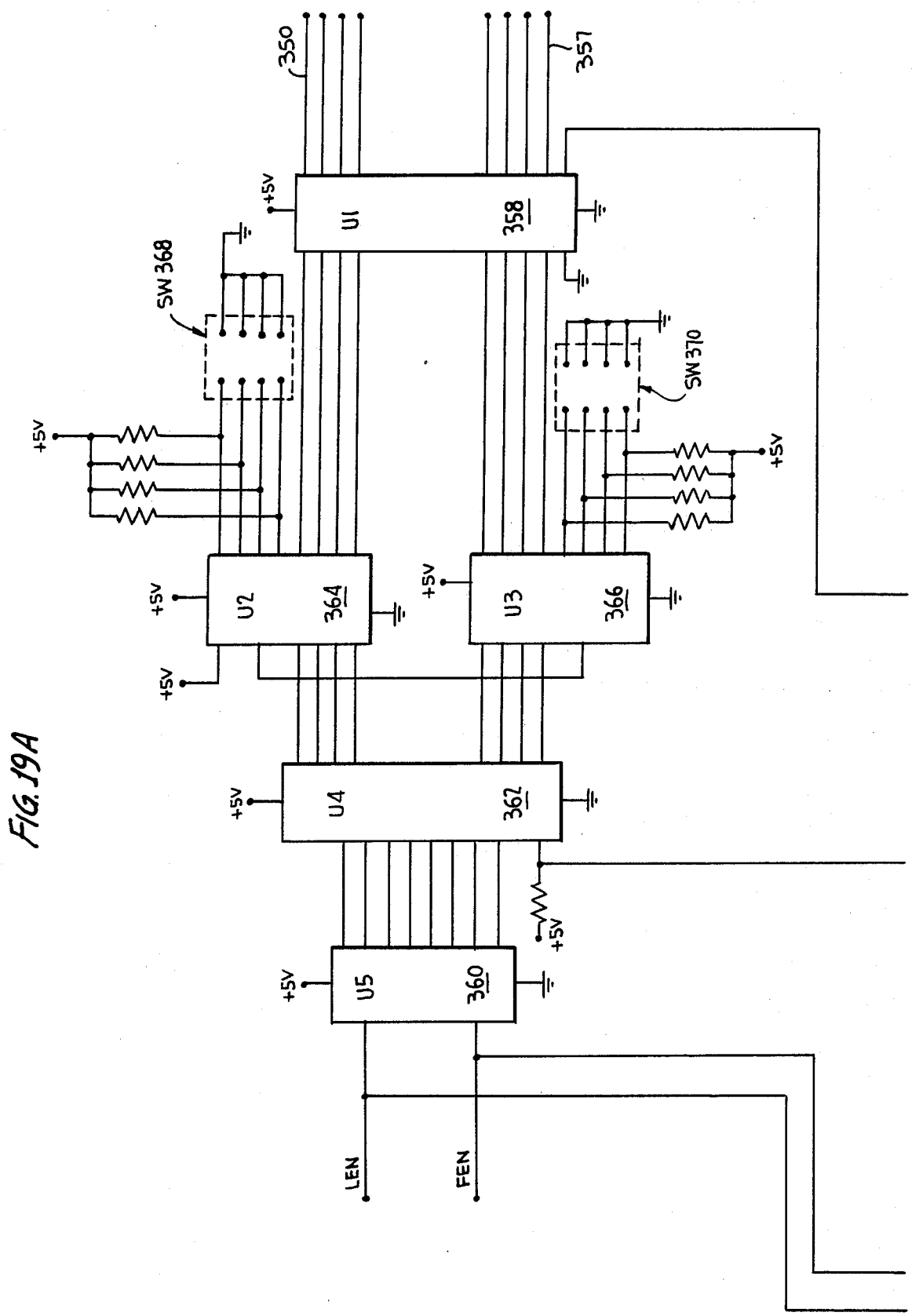
FIGS. 19A and 19B are schematics of the memory circuitry of the ORWS.
Figure 19B:
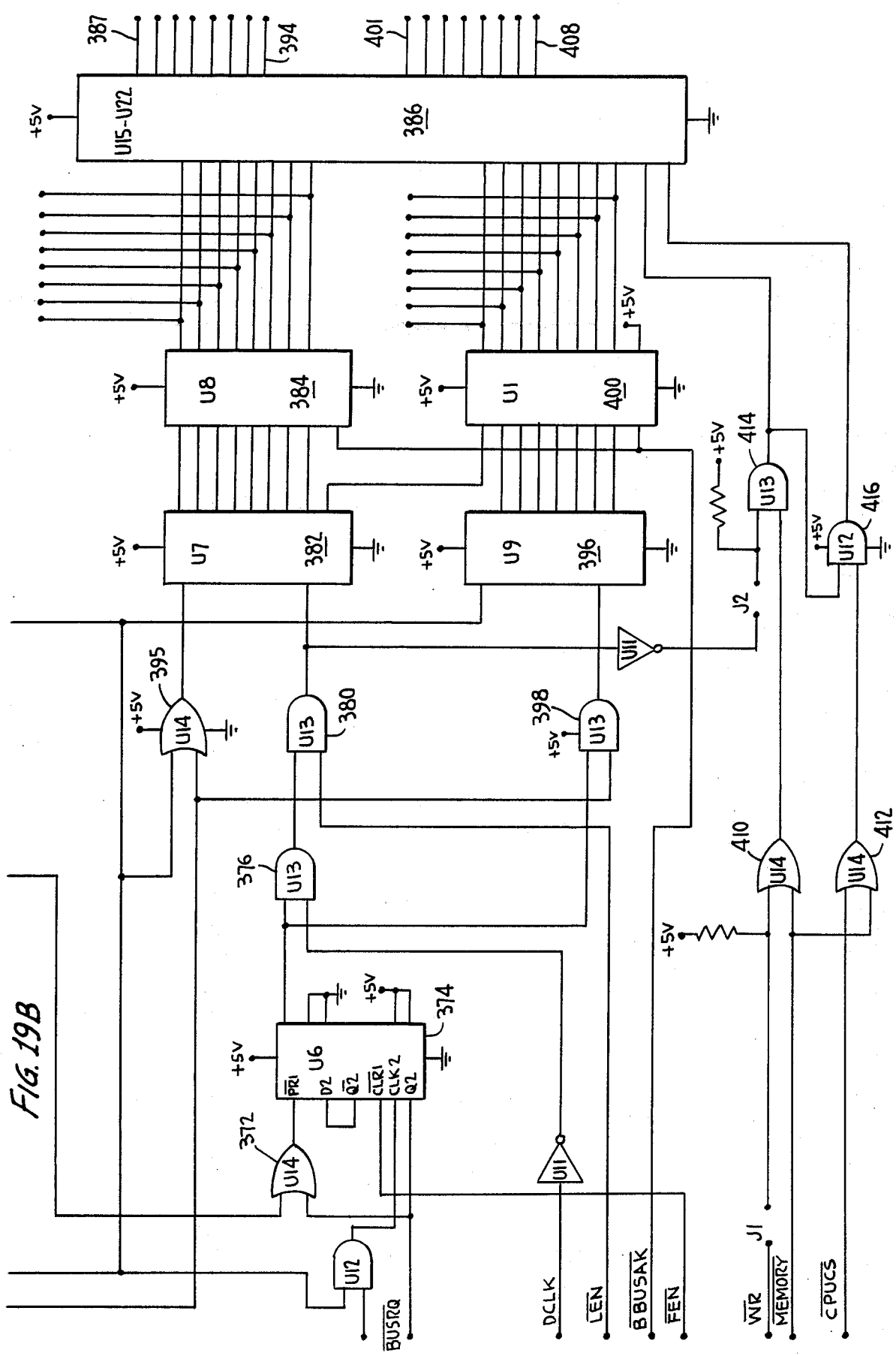

| Component | Component Type |
|---|---|
| FIGS. 18A and 18B | |
| U1, U2, U3, U4, U5, U6, U7, U8, U9 and U10 | 74HC573 |
| U9 and U10 | 74HC154 |
| U13 and U14 | 74HC04 |
| FIGS 19A and 19B | |
| U1, U8 and U10 | 74HC573 |
| U2 and U3 | 74HC283 |
| U4 | 74LS684 |
| U5, U7 and U9 | 74HC4040 |
| U6 | 74HC74 |
| U11 | 74HC04 |
| U12 and U13 | 74HC08 |
| U14 | 74HC32 |
| U15, U16, U17, U18, U19, U20, U21 and U22 | uPD4361 |

What is claimed is:

1. Apparatus for the non-contact measurement of rail parameters, comprising:
   means for illuminating at least one of the left and right rails of a track;
   means for detecting a selected portion of light reflected from at least one of the left and right rails and generating video signals representative thereof;
   said means for illuminating and said means for detecting being mounted for movement along said rails; and
   means for processing said video signals to determine at least one of the gage and wear of said rails using a repetitive frame scanning pattern formed by a grid of lines perpendicular to the profile of said rails with each line including a number of pixels, and including means for determining a line and the location of a pixel therein representative of at least a gage point on the gage face of at least one of said left and right rails for selected frames of said repetitive frame scanning pattern.

2. Apparatus according to claim 1, wherein said means for processing further includes means for converting said video signals to binary video signals containing grey scale data, means for sampling pixels to establish a floating threshold for comparing grey scale levels to establish binary "0" and binary "1" respectively representative of black and white levels, first means for filtering said pixels within a selected time window at a pre-determined gage point to generate filtered pixel output, second means for filtering line data within said repetitive frame scanning pattern to establish a reference line and adding said filtered pixel output thereto, and said means for determining includes means for examining pixel data to determine the presence of a selected number of successive white pixels to determine the line and location of a pixel therein representative of at least said gage point.

3. Apparatus according to claim 2, wherein said means for detecting includes means for generating vertical and horizontal sync signals and pixel clock signals.

4. Apparatus according to claim 3, wherein said means for sampling includes means for adding a fixed number of grey levels to an estimated threshold and the comparison of grey levels is with respect to a reference grey level.

5. Apparatus according to claim 4, wherein said first means for filtering includes means for subtracting a fixed number from a reference gage point to obtain said predetermined gage point.

6. Apparatus according to claim 5, wherein second means for filtering receives gage point data from said means for determining and further includes means for subtracting an offset from said data and an incremental line counter for incrementing a line count in each said frame and means for comparing the count in said incremental line counter with the output from said means for subtracting.

7. Apparatus according to claim 6, wherein said means for examining includes respective black and white counters for counting respective black and white pixels and means for comparing the black and white pixel count with said preselected number and further including means responsive to said pixel clock and to line frame signals to determine the line and location of a pixel to obtain said gage point.

8. Apparatus according to claim 2, wherein said means for illuminating is substantially perpendicular to at least one of said left and right rails.

9. Apparatus according to claim 2, wherein said means for sampling includes means for adding a fixed number of grey levels to an estimated threshold and the comparison of grey levels is with respect to a reference grey level.

10. Apparatus according to claim 2, wherein said first means for filtering includes means for subtracting a fixed number from a reference gage point to obtain said predetermined gage point.

11. Apparatus according to claim 2, wherein second means for filtering receives gage point data from said means for determining and further includes means for subtracting an offset from said data and an incremental line counter for incrementing a line count in each said frame and means for comparing the count in said incremental line counter with the output from said means for subtracting.

12. Apparatus according to claim 2, wherein said means for examining includes respective black and white counters for counting respective black and white pixels and means for comparing the black and white pixel count with said preselected number and further including means responsive to said pixel clock and to line frame signals to determine the line and location of a pixel to obtain said gage point.

13. Apparatus according to claim 1, wherein said means for determining includes means for determine a point "a" on the rail representing the minimum thickness on the rail webb, means for subtracting a predetermined distance from the line axis of the coordinates of point "a" to determine a point "d", means for subtracting one-half of the rail webb thickness from the line axis of the coordinates for point "a", and means for subtracting a fixed distance from the pixel axis of the coordinates for point "b" to determine the exact gage point on the gage face of the rail.

14. Apparatus according to claim 13, further comprising means responsive to the location of the exact gage point for determining the total top wear and side wear of the rail.

15. A method for the non-contact measurement of rail parameters, comprising:
  illuminating at least one of the left and right rails of a track;
  detecting a selected portion of light reflected from at least one of the left and right rails and generating video signals representative thereof;
  moving the illumination and detection along said track;
  processing said video signals to determine at least one of the gage and wear of said rails using a repetitive frame scanning pattern formed by a grid of lines perpendicular to the profile of said rails with each line including a number of pixels; and
  determining a line and the location of a pixel therein representative of at least a gage point on the gage face of at least one of said left and right rails for selected frames of said repetitive frame scanning pattern.

16. A method according to claim 15, wherein the processing of the video signals includes converting the video signals to binary video signals containing grey scale data, sampling pixels to establish a floating threshold for comparing grey scale levels to establish binary "0" and binary "1" respectively representative of black and white levels, filtering said pixels within a selected time window at a predetermined gage point to generate filtered pixel output, filtering line data within said repetitive frame scanning pattern to establish a reference line and adding said filtered pixel output thereto, and examining pixel data to determine the presence of a selected number of successive white pixels to determine the line and location of a pixel therein representative of at least said gage point.

17. A method according to claim 16, wherein the step of detecting includes the generation of vertical and horizontal sync signals and pixel clock signals.

18. A method according to claim 17, wherein the step of sampling includes adding a fixed number of grey levels to an estimated threshold and the step of comparing grey levels is with respect to a reference grey level.

19. A method according to claim 18, wherein the first step of filtering includes subtracting a fixed number from a reference gage point to obtain said predetermined gage point.

20. A method according to claim 18, wherein said second step of filtering includes receiving gage point data from said step of determining and further includes subtracting an offset from said data and incrementing a line count in each said frame and comparing the incremented count with the output from said step of subtracting.

21. A method according to claim 20, wherein said step of examining includes counting respective black and white pixels and comparing the black and white pixel count with said preselected number and further including determining the line and location of a pixel to obtain said gage point responsive to said pixel clock and to line frame signals.

22. A method according to claim 16, wherein the illumination occurs at substantially right angles to at least one of said left and right rails.

23. A method according to claim 16, wherein the step of sampling includes adding a fixed number of grey levels to an estimated threshold and the comparison of grey levels is with respect to a reference grey level.

24. A method according to claim 16, wherein the first step of filtering includes subtracting a fixed number from a reference gage point to obtain said predetermined gage point.

25. A method according to claim 16, wherein the second step of filtering includes receiving gage point data from the step of determining and includes subtracting an offset from the gage point data and counting the line count in each of the frames and comparing the count with the output from the step of subtracting.

26. A method according to claim 16, wherein the step of examining includes counting respective black and white pixels and comparing the black and white pixel count with the preselected number and determining the line and pixel location from the pixel clock and line frame signals.

27. A method according to claim 15, wherein said step of determining includes determining a point "a" on the rail representing the minimum thickness on the rail webb, subtracting a predetermined distance from the line axis of the coordinates of point "a" to determine a point "d", subtracting one-half of the rail webb thickness from the line axis of the coordinates for point "a", subtracting a fixed distance from the pixel axis of the coordinates for point "b" to determine the exact gage point on the gage face of the rail.

28. A method according to claim 27, further comprising determining the total top wear and side wear of the rail using the exact gage point.

* * * * *